(12) United States Patent
Gao et al.

(10) Patent No.: US 12,444,189 B2
(45) Date of Patent: Oct. 14, 2025

(54) METHODS AND SYSTEMS FOR CLASSIFYING AND BENCHMARKING IRRIGATION PERFORMANCE

(71) Applicants: Rubicon Research Pty Ltd, Victoria (AU); The University of Melbourne, Victoria (AU)

(72) Inventors: Zitian Gao, Victoria (AU); Danlu Guo, Victoria (AU); Andrew William Western, Victoria (AU); Dongryeol Ryu, Victoria (AU); David John Aughton, Victoria (AU)

(73) Assignees: Rubicon Research Pty Ltd, Victoria (AU); The University of Melbourne, Victoria (AU)

( * ) Notice: Subject to any disclaimer, the term of this patent is extended or adjusted under 35 U.S.C. 154(b) by 0 days.

(21) Appl. No.: 18/719,543

(22) PCT Filed: Dec. 14, 2022

(86) PCT No.: PCT/AU2022/051505
§ 371 (c)(1),
(2) Date: Jun. 13, 2024

(87) PCT Pub. No.: WO2023/108213
PCT Pub. Date: Jun. 22, 2023

(65) Prior Publication Data
US 2025/0054298 A1    Feb. 13, 2025

(30) Foreign Application Priority Data
Dec. 14, 2021 (AU) ................................ 2021904049

(51) Int. Cl.
*G06V 20/00*    (2022.01)
*G06T 3/40*     (2006.01)
(Continued)

(52) U.S. Cl.
CPC .............. *G06V 20/188* (2022.01); *G06T 3/40* (2013.01); *G06T 7/13* (2017.01); *G06V 10/762* (2022.01); *G06V 10/764* (2022.01)

(58) Field of Classification Search
CPC ......... G06V 10/00; G06V 20/00; H04N 19/00
See application file for complete search history.

(56) References Cited

U.S. PATENT DOCUMENTS

2015/0016668 A1*  1/2015  Cheriyadat ............ G06V 10/50
                                                         382/103
2016/0171302 A1   6/2016  Lavigne et al.
(Continued)

FOREIGN PATENT DOCUMENTS

WO    2002071163 A1    9/2002
WO    2013016769 A1    2/2013
(Continued)

OTHER PUBLICATIONS

International Search Report dated Mar. 27, 2023, for corresponding International Application No. PCT/AU2022/051505, filed Dec. 14, 2022.

(Continued)

*Primary Examiner* — Maryam A Nasri
(74) *Attorney, Agent, or Firm* — David D. Brush; Westman, Champlin & Koehler, P.A.

(57) ABSTRACT

An automated method of classifying irrigation status of fields within a geographical region includes identifying a plurality of field areas delineated by field boundaries within the geographical region. Seasonal normalised difference vegetation index (NDVI) time series data are processed to generate a plurality of aggregate field NDVI feature values for each identified field area. Irrigation status of each identified field area is classified by executing a decision tree classifier that is configured to determine a classification as (Continued)

either 'irrigated' or 'non-irrigated' based upon the corresponding plurality of aggregate field NDVI feature values.

25 Claims, 20 Drawing Sheets

(51) Int. Cl.
*G06T 7/13* (2017.01)
*G06V 10/762* (2022.01)
*G06V 10/764* (2022.01)
*G06V 20/10* (2022.01)

(56) References Cited

U.S. PATENT DOCUMENTS

| | | | |
|---|---|---|---|
| 2016/0314586 A1* | 10/2016 | Lavigne | G06Q 50/06 |
| 2021/0224967 A1 | 7/2021 | Stueve et al. | |
| 2021/0345567 A1 | 11/2021 | Klemm et al. | |
| 2025/0131716 A1* | 4/2025 | Song | G06V 10/28 |

FOREIGN PATENT DOCUMENTS

| | | |
|---|---|---|
| WO | 2015031954 A1 | 3/2015 |
| WO | 2019033158 A1 | 2/2019 |
| WO | 2019090391 A1 | 5/2019 |
| WO | 2020047579 A1 | 3/2020 |
| WO | 2021062147 A1 | 4/2021 |

OTHER PUBLICATIONS

Written Opinion of the International Searching Authority dated Mar. 27, 2023, for corresponding International Application No. PCT/AU2022/051505, filed Dec. 14, 2022.

Sharma, A. K. et al., "Identifying Seasonal Groundwater-Irrigated Cropland Using Multi-Source NDVI Time-Series Images"—Remote Sensing—2021, 13, 1960, published May 18, 2021.

Sharma, A. K. et al., "Irrigation History Estimation Using Multitemporal Landsat Satellite Images: Application to an INtensive Groundwater Irrigated Agricultural Watershed in India"—Remote Sensing—2018, 10, 893, published Jun. 7, 108.

International Type Search Report dated Jan. 27, 2022, for corresponding AU Application No. 2021904049, filed Dec. 14, 2021.

International Preliminary Report on Patentability dated Aug. 2, 2023 for corresponding International Application No. PCT/AU2022/051505, filed Dec. 14, 2022.

Araya S. et al., "CropPhenology: An R package for extracting crop phenology from time series remotely sensed vegetation index imagery," Ecological Informatics 46 (2018) 45-56, https://doi.org/10.1016/j.ecoinf.2018.05.006.

* cited by examiner

METHODS AND SYSTEMS FOR CLASSIFYING AND BENCHMARKING IRRIGATION PERFORMANCE

CROSS-REFERENCE TO RELATED APPLICATIONS

This Application is a Section 371 National Stage Application of International Application No. PCT/AU2022/051505, filed Dec. 14, 2022, and published as WO 2023/108213 on Jun. 22, 2023, in English, which claims priority from Australian Provisional Application No. 2021904049, filed Dec. 14, 2021, the entire contents of which are incorporated herein by reference.

FIELD OF THE INVENTION

The present invention relates to agricultural management, and more particularly, in various aspects, to automated methods and systems for land surface classification providing improved detection and measurement of irrigated cropping fields, classification of crop types over irrigated areas, benchmarking of water supply and crop water demand to estimate relative water use between farms, and estimation of variability in benchmarking results given by data from different sources. Embodiments of the invention combine data from remote sensing, survey and ground measurements and apply advanced computational methods, including machine learning techniques.

BACKGROUND TO THE INVENTION

Globally, irrigated agriculture plays an important role in supporting agricultural production. However, water availability in the irrigation sector is limited due to competing demands in other industries and the impact of changing climate. Consequently, effective planning and management are of great importance to support sustainable development in irrigated agriculture and to secure food supply. Monitoring the capability of irrigation areas is an important component of efficient irrigation management, which is assisted by accurate irrigated area mapping. An irrigated area map is a fundamental input to understand irrigation water demand, water allocation and efficiency. It is also one of the critical inputs to hydrological modelling, water budgeting and decision-making.

Remote sensing is a useful tool to support irrigated area mapping because it provides comprehensive spatial data with global coverage and at an affordable cost. Irrigated fields can be mapped by using a single representative snapshot at the critical time (e.g. peak during a season) or using a time series of images across the crop growing season. Inputs such as raw reflectance bands or vegetation indices are commonly used to describe the distinctive features of irrigated fields. Normalized difference vegetation index (NDVI) is a common choice because: it has a good representation of green biomass that is changing with the growth of crops; it is an easily accessible indicator that can be generated from a wide range of optical satellites; and it is a normalized indicator which reduces the dependency on atmospheric calibration and surface reflectance products. However, most existing irrigated area mapping methods have limitations when applied to regions that involve many fields and/or over multiple years.

While pixel-scale NDVI values are commonly used in classification, some existing approaches aggregate pixel-level NDVIs to the field level in an effort to improve classification results. Field-scale analysis delineates field boundaries as a prior step so that irrigated areas can be displayed on "real object" (fields). Although there is an increasing trend toward field-scale analysis, limited attention has been paid to errors introduced when transferring pixel-scale data to field scale. Commonly, all pixels within a field to are used to calculate field-average data, which assumes that agricultural fields are homogenous. In practice, however, each cropping field can be heterogeneous, with multiple types of objects in one field. Sub-field-scale variabilities caused by non-crop patches, such as pixels from bare soil patches, trees, animals, shelter and field boundaries will be included in the field-scale aggregation when all the pixel values within the field are used, which leads to poor quality in field-level data.

Another common challenge in irrigated field mapping is the development of a method that can be applied across multiple years without manual tuning of its parameters. Routine irrigated area monitoring is important to support multi-year irrigation management due to the highly dynamic nature of irrigated areas. However, many prior art methods are designed to work over a short period (e.g. a single year or a single season), with limited applicability to mapping dynamic field conditions over multiple years. Consequently, there is a general lack of systematic methods/models to perform automated classification across multiple years/seasons under varying hydro-climatic conditions.

Embodiments of the present invention are therefore directed to meeting the ongoing need for a remote-sensing-based framework for irrigated field classification that can provide improved field boundary delineation, that achieves more accurate field-scale NDVI aggregation and irrigation classification, and/or that is transferable across time periods (seasons or years). Further, some embodiments apply the improved framework to benchmarking of water supply and crop water demand. Embodiments of the invention are also applied to improve the operation of irrigation management systems.

SUMMARY OF THE INVENTION

In one aspect, the invention provides an automated method of classifying irrigation status of fields within a geographical region comprising:
  identifying a plurality of field areas delineated by field boundaries within the geographical region;
  processing seasonal normalised difference vegetation index (NDVI) time series data to generate a plurality of aggregate field NDVI feature values for each identified field area; and
  classifying irrigation status of each identified field area by executing a decision tree classifier that is configured to determine a classification as either 'irrigated' or 'non-irrigated' based upon the corresponding plurality of aggregate field NDVI feature values.

Advantageously, embodiments of the invention may provide improved analysis of field-scale NDVI aggregates to compute values of a set, or vector, of NDVI features as input to the decision tree classifier. The classifier may employ advanced computational methods, including machine learning techniques, to classify each field as 'irrigated' or 'non-irrigated' with improved accuracy when compared with prior art approaches.

In embodiments of the invention, the step of identifying a plurality of field areas delineated by field boundaries may comprise analysing digital imagery of the geographical region. The analysing may comprise, for each one of the field areas: computing a grey-level co-occurrence matrix (GLCM) to obtain a GLCM-variance value; determining a scale level parameter value based on the GLCM-variance value; and executing an edge-based watershed transform algorithm using the determined scale level parameter value to determine the field boundaries. It has been found that using texture features of the digital imagery, as obtained from a computed GLCM, to inform parameter selection can improve the performance of the watershed algorithm in delineating field boundaries.

In embodiments, the scale level parameter value is determined according to a step-wise series of predetermined values based on a monotonic relationship between the GLCM-variance value and the scale level parameter value. In particular, it has been found that there is an approximately linear relationship between GLCM-variance and an optimal setting of the scale level parameter of the watershed transform algorithm over a range of interest, and that a discrete set of scale level parameter value selections based upon this relationship is able to provide substantial improvements in performance of the algorithm and avoid the need for manual optimisation.

The step of processing seasonal NDVI data may comprise: acquiring an NDVI time sequence comprising a plurality of NDVI images of the geographical region each captured at a corresponding capture time within a seasonal period; executing a resampling algorithm to obtain, for each field area at each capture time within the seasonal period, a corresponding single representative NDVI value; and computing the plurality of aggregate field NDVI feature values for each field area using the corresponding representative NDVI values. Advantageously, the resampling algorithm comprises a resampling Gaussian Mixture Model (GMM) algorithm. In particular, a GMM-based resampling approach has been developed that results in a more representative field-scale NDVI estimate than more primitive prior art approaches, such as simple averaging of field pixel values.

Preferably, the resampling GMM algorithm comprises a two-component GMM algorithm from which, for each field area, first and second clusters of NDVI pixel values are identified, and a representative NDVI value is computed for each field area by determining whether the second cluster is more representative of the field area than the first cluster and, if so, then using the NDVI pixel values of the second cluster to compute the representative NDVI value.

In particular embodiments, where the first and second clusters of NDVI pixel values have corresponding mean values $\mu_1$ and $\mu_2$ with $\mu_2 > \mu_1$, and corresponding standard deviations $\sigma_1$ and $\sigma_2$, the representative NDVI value is computed by: using a t-test to determine whether a difference between $\mu_1$ and $\mu_2$ is statistically significant; in the event that the difference is statistically significant then selecting $\mu_2$ as the representative NDVI value if the number of NDVI pixels in the second cluster is greater than a threshold proportion of the total number of NDVI pixels in the field area, otherwise selecting $\mu_1$ as the representative NDVI value; and in the event that the difference is not statistically significant, then computing an average of all NDVI pixels in the field area as the representative NDVI value.

The threshold proportion of the total number of NDVI pixels in the field area is preferably about 20%.

In some embodiments, the plurality of aggregate NDVI feature values for each field area comprises: a maximum of the representative NDVI values over all capture times within the seasonal period; and a range of the representative NDVI values, calculated using a difference between a maximum and a minimum of the representative NDVI values over all capture times within the seasonal period.

In some embodiments, the set of aggregate NDVI feature values for each field area further comprises one or more values selected from:
  the representative NDVI values at each capture time within the seasonal period;
  an average of a selected group of the representative NDVI values from the capture times within the seasonal period;
  a minimum of the representative NDVI values over all capture times within the seasonal period;
  a set of categorical values indicating whether or not the representative NDVI values at each capture time within the seasonal period is above or below a predetermined threshold;
  one or more values indicative of a sub-period of capture times within the seasonal period during which the representative NDVI values are within a predetermined upper and/or lower quantile;
  one or more values indicative of a number of capture times within the seasonal period during which the representative NDVI values are above a predetermined value; and
  one or more values calculated from a difference between a selected pair of the representative NDVI values from the capture times within the seasonal period.

More particularly, the selected group of the representative NDVI values from which the average is calculated may comprise the three largest representative NDVI values of the capture times within the seasonal period. The predetermined threshold used to obtain the set of categorical values may be about 0.6. The predetermined upper quantile used to obtain the values indicative of a sub-period of capture times within the seasonal period may be an 80% quantile. The predetermined lower quantile used to obtain the values indicative of a sub-period of capture times within the seasonal period may be a 20% quantile. The predetermined value used to obtain the values indicative of a number of capture times within the seasonal period during which the representative NDVI values are above the predetermined value may be selected from the set $\{0.5, 0.6, 0.7, 0.8\}$. The selected pair of the representative NDVI values from the capture times within the seasonal period from which the difference is obtained may be a successive pair having a largest positive difference. The selected pair of the representative NDVI values from the capture times within the seasonal period from which the difference is obtained may be a pair having a second and third largest representative NDVI values.

In some embodiments, the decision tree classifier comprises a single tree with a depth of two, wherein execution of the decision tree classifier comprises:
  determining, at a first split, whether the maximum of the representative NDVI values is greater than a threshold maximum NDVI value and, if so, then determining, at a second split, whether the range of the representative NDVI values is greater than a threshold NDVI range value and, if so, then classifying the corresponding field area as 'irrigated'; and
  otherwise, classifying the corresponding field area as 'non-irrigated'.

The threshold maximum NDVI value may be a predetermined value and, in particular, may be about 0.6.

Alternatively, the threshold maximum NDVI value may be a dynamic value that is computed based upon maximum representative NDVI values corresponding with all field areas within the geographical region over all capture times within the seasonal period. Advantageously, using a dynamic threshold may enable embodiments of the invention to better adapt to variations over time, e.g. between different seasons and/or years.

In some embodiments, the dynamic threshold maximum NDVI value is computed by executing a threshold determination GMM algorithm. The threshold determination GMM algorithm may comprise a k-component GMM algorithm, wherein the number of components, k, is determined by applying Bayesian Inference Criteria (BIC) to optimise a fit of the GMM model to a distribution of the maximum representative NDVI values, whereby each of the maximum representative NDVI values is allocated into an i-th cluster of k total clusters wherein the distribution of cluster values is modelled as a Normal distribution $N_i(\mu_i, \sigma_i)$.

The threshold determination GMM algorithm may further comprise reassigning the maximum representative NDVI values of the k clusters to first and second derived clusters by a method comprising steps of:
  computing a reassignment quantile for each cluster i of the k clusters;
  reassigning the maximum representative NDVI values of clusters for which the reassignment quantile is less than a reassignment threshold to the first derived cluster; and
  reassigning the maximum representative NDVI values of clusters for which the reassignment quantile is greater than or equal to the reassignment threshold to the second derived cluster,
  wherein the dynamic threshold maximum NDVI value is computed based upon statistical parameters of the first and second derived clusters.

In embodiments, where the first and second derived clusters of maximum representative NDVI values have corresponding mean values $\mu_{d1}$ and $\mu_{d2}$, corresponding standard deviations $\sigma_{d1}$ and $\sigma_{d2}$, the dynamic threshold maximum NDVI value ($T_d$) may be computed according to:

$$T_d = \frac{\mu_{d1} \cdot \sigma_{d2} + \mu_{d2} \cdot \sigma_{d1}}{\sigma_{d1} + \sigma_{d2}}$$

In embodiments, the threshold NDVI range value is a predetermined value, and may be about 0.4.

In some embodiments, the decision tree classifier comprises a random forest machine learning (RFML) model that is preconfigured to take the plurality of aggregate field NDVI feature values of an identified field area as input, and to generate an output value indicative of whether the identified field area is 'irrigated' or 'non-irrigated'. Preconfiguring the RFML model preferably comprises training the RFML model in a supervised training mode using training data consisting of a plurality of training sets of aggregate field NDVI feature values and corresponding label values identifying each training set of aggregate field NDVI feature values as either 'irrigated' or 'non-irrigated'.

In embodiments, the training data is compiled by a method comprising:
  identifying a plurality of training data field areas and associated training data time periods for which irrigation information is available as to whether the field areas were irrigated or non-irrigated;
  computing training sets of aggregate field NDVI feature values for each identified training field area over each training data time period;
  categorising each training data field area as a 'static' field area if the corresponding training sets of aggregate field NDVI feature values do not vary significantly between training data time periods, or as a 'dynamic' field area if the corresponding training sets of aggregate field NDVI feature values do vary significantly between training data time periods;
  compiling a static training data subset comprising the training sets of aggregate field NDVI feature values and corresponding irrigation information for each training data field area classified as a 'static' field area; and
  training the RFML model using the static training data subset.

Advantageously, compiling a training sample pool having distinct categories of 'static' and 'dynamic' fields makes it possible to update only the 'dynamic' samples for different time periods, i.e. seasons and/or years, thereby significantly reducing the processing required for retraining the RFML model to account for variations over time. In particular, the efforts required to acquire and process training samples for individual seasons and/or years, which is a time-consuming process, can be significantly mitigated. Accordingly, in embodiments of the invention the method further comprises:
  compiling a dynamic training data subset comprising updated training sets of aggregate field NDVI feature values and corresponding irrigation information for each training data field area classified as a 'dynamic' field area; and
  retraining the RFML model using the static and dynamic training data subsets.

In another aspect, the invention provides an automated method for estimating crop irrigation performance within a geographical region comprising:
  identifying a plurality of field areas delineated by field boundaries within the geographical region;
  processing seasonal normalised difference vegetation index (NDVI) time series data to generate a plurality of aggregate field NDVI feature values for each identified field area;
  classifying irrigation status of each identified field area by executing a decision tree classifier that is configured to determine a classification as either 'irrigated' or 'non-irrigated' based upon the corresponding plurality of aggregate field NDVI feature values;
  using remote sensing data to determine one or more properties of crops within each irrigated field area, wherein the properties include at least a crop coefficient ($k_c$) of each irrigated area;
  for each irrigated field area, using the determined crop coefficient and recorded weather data to calculate an estimate of crop water requirements; and
  computing values of one or more crop irrigation performance indicators based at least upon the calculated estimates of crop water requirements, and measures of irrigation water supplied to the geographical region.

The step of identifying a plurality of field areas delineated by field boundaries may comprise analysing digital imagery of the geographical region. Advantageously, the steps of analysing digital imagery, processing seasonal NDVI data, and/or classifying irrigation status are performed using a method according to the first aspect of the invention.

In another aspect, the invention provides a system for classifying irrigation status of fields within a geographical region comprising:
  a processor;
  a memory device accessible by the processor; and
  a data store accessible by the processor,
  wherein the memory device contains a body of program instructions which, when executed by the processor, cause the system to implement a method comprising:

identifying a plurality of field areas delineated by field boundaries within the geographical region;

retrieving seasonal normalised difference vegetation index (NDVI) time series data from the data store;

processing the seasonal NDVI time series data to generate a plurality of aggregate field NDVI feature values for each identified field area; and classifying irrigation status of each identified field area by executing a decision tree classifier that is configured to determine a classification as either 'irrigated' or 'non-irrigated' based upon the corresponding plurality of aggregate field NDVI feature values.

The step of identifying a plurality of field areas delineated by field boundaries may comprise retrieving digital imagery of the geographical region from the data store and analysing the digital imagery. Advantageously, the method implemented by the processor executing the body of program instructions is performed using a method according to the first aspect of the invention.

In another aspect, the invention provides a system for estimating crop irrigation performance within a geographical region comprising:

a processor;
a memory device accessible by the processor; and
a data store accessible by the processor,
wherein the memory device contains a body of program instructions which, when executed by the processor, cause the system to implement a method comprising:
identifying a plurality of field areas delineated by field boundaries within the geographical region;
retrieving seasonal normalised difference vegetation index (NDVI) time series data from the data store;
processing the seasonal NDVI time series data to generate a plurality of aggregate field NDVI feature values for each identified field area;
classifying irrigation status of each identified field area by executing a decision tree classifier that is configured to determine a classification as either 'irrigated' or 'non-irrigated' based upon the corresponding plurality of aggregate field NDVI feature values;
retrieving remote sensing data of the geographical area from the data store;
using the remote sensing data to determine one or more properties of crops within each irrigated field area, wherein the properties include at least a crop coefficient ($k_c$) of each irrigated area;
retrieving recorded weather data from the data store;
for each irrigated field area, using the determined crop coefficient and the recorded weather data to calculate an estimate of crop water requirements;
retrieving measured irrigation water supplied to the geographical region from the data store; and
computing values of one or more crop irrigation performance indicators based at least upon the calculated estimates of crop water requirements and the measured irrigation water supplied to the geographical region.

The step of identifying a plurality of field areas delineated by field boundaries may comprise retrieving digital imagery of the geographical region from the data store and analysing the digital imagery. Advantageously, the steps of analysing digital imagery, processing seasonal NDVI data, and classifying irrigation status in the method implemented by the processor executing the body of program instructions are performed using a method according to the first aspect of the invention.

In a further aspect, the invention provides a computer program product comprising a computer-readable medium having instructions stored thereon which, when executed by a processor implement a method of systems according to one of the preceding aspects of the invention.

In another aspect, the invention provides an irrigation management system to irrigate field areas via a water distribution network within a geographical region, comprising:

an irrigation status classification system including a processor configured to identify a plurality of field areas delineated by field boundaries within the geographical region, retrieve seasonal normalised difference vegetation index (NDVI) time series data from the data store, process the seasonal NDVI time series data to generate a plurality of aggregate field NDVI feature values for each identified field area, and classify irrigation status of each identified field area by executing a decision tree classifier that is configured to determine a classification as either 'irrigated' or 'non-irrigated' based upon the corresponding plurality of aggregate field NDVI feature values;

a soil moisture determination system including a networked computer system connected to a plurality of weather stations within the geographical region to measure a selection from solar radiation spectrum, wind speed, rainfall, temperature, humidity, barometric pressure, and energy measurement from solar panels at each of a plurality of representative locations, the networked computer system having data access to crop factor, soil type, and irrigation historical data at the representative locations, and producing an algorithm for evapotranspiration based on a predetermined selection from the weather station measurements and the data access to crop factor, soil type, and irrigation historical data at the representative locations, the networked computer system calibrating the algorithm by direct measurement of the moisture in the soil at each of the representative locations by respective soil moisture sensors and using measured parameters of rainfall, soil type, irrigation historical data and crop factor with the algorithm to derive or interpolate soil moisture within irrigated field areas identified by the irrigation status classification system; and a water ordering system configured to monitor soil moisture determined by the soil moisture determination system for irrigation units including irrigated field areas identified by the irrigation status classification system, receive requests for timed irrigation from end users for the irrigation units, and to allow requested irrigation to occur for the irrigation units from the water distribution network based on the monitored soil moisture.

The irrigation management system may further comprise:

a plant stress determination system including a computer-based camera system having thermal imaging and visual imaging to capture foliage at close proximity to at least one plant to provide high resolution images/video thereof, configured to analyse both thermal and visual images/video therefrom to form a composite image, determine the thermal activity of the composite image/video and photosynthesis state of said at least one plant, and derive plant stress from said determination, wherein the water ordering system is further configured to monitor plant stress determined by the plant stress determination system for irrigation units including irrigated field areas identified by the irrigation status classification system, and to allow requested irrigation to occur for the irrigation units from the water distribution network based on the monitored plant stress.

The water ordering system may further be configured to generate evapotranspiration (ET) and/or soil moisture deficit (SMD) reports for the irrigation units, to assist end users in scheduling requests for timed irrigation, and may also be configured to aggregate ET and/or SMD data for the irrigation units, to provide summary ET and/or SMD data for segment areas of the water distribution network.

The irrigation management system may further comprise an efficiency monitoring system configured to determine water use efficiency (WUE) of the irrigation units based on volume of water supplied via the water ordering system and ET and/or SMD data for the irrigation units. The efficiency monitoring system may also be configured to aggregate WUE data for the irrigation units, to provide summary WUE data for segment areas of the water distribution network and/or summary WUE data for the entire water distribution network. The efficiency monitoring system may also generate benchmarking comparisons of WUE for one or more of: individual irrigation units; a summary level within the water distribution network; and irrigation units having common characteristics selected from a group including crop type, soil type, enterprise type, and irrigation application type.

The irrigation management system may further comprise a forecasting system configured to predict irrigation demand based on aggregated ET and/or SMD for segment areas of the water distribution network and/or for the entire water distribution network. The forecasting system may further be configured to analyse parameters including water request data and SMD data to determine an SMD level at which end users typically request irrigation and one or both of: a typical target SMD level at the completion of irrigation; and a volume of water applied. The parameters analysed by the forecasting system may further include one or more of irrigation application method, crop type, and soil type. The forecasting system may further be configured to use climate forecasts to predict longer-term crop ET, rainfall and irrigation demand.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features, and wherein.

DESCRIPTION OF EMBODIMENTS

Figure 1:
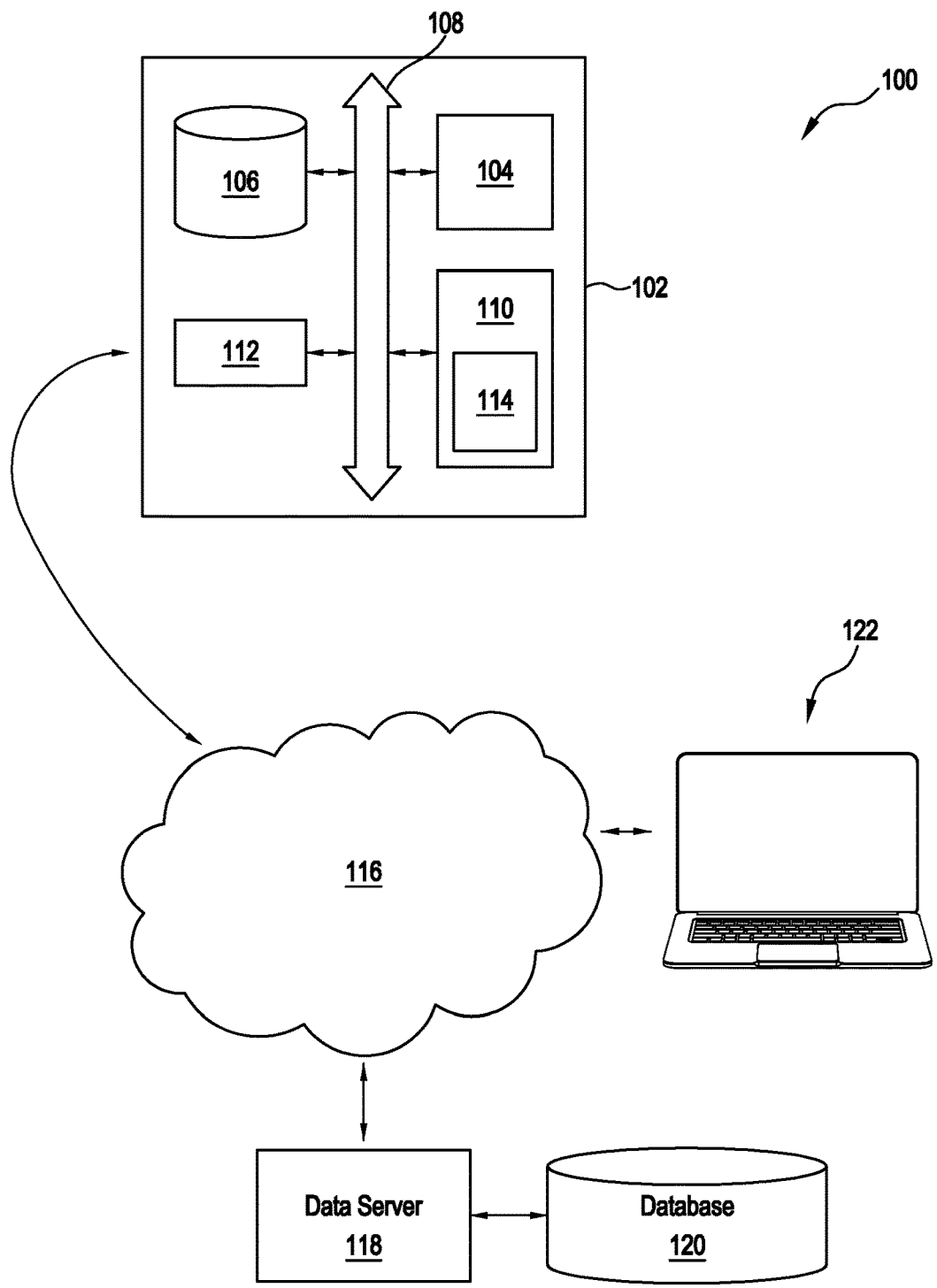
FIG. 1 is a block diagram illustrating an exemplary networked system including an irrigation analysis server embodying the invention.

FIG. 1 is a block diagram illustrating an exemplary networked system 100 including an irrigation analysis server 102 embodying the invention. A networked system is described by way of example because the use of online computing resources, such as cloud computing platforms, is common. However, the system 100 is presented only as an example of an environment in which the invention may be implemented. In alternative embodiments, the functions of the networked system 100 may be implemented at a single location, or may employ a single computing platform, such as a desktop PC, to implement some or all of the functionality described.

In particular, the irrigation analysis server 102 comprises a computer-implemented system which is configured to execute methods of classifying irrigation status of fields within a geographical region, and associated methods of estimating crop irrigation performance, embodying the invention. These methods may be implemented using a range of available, general-purpose, computer hardware and software platforms as exemplified in FIG. 1. However, as described in greater detail below with reference to FIGS. 2 to 23 they comprise improvements in computer technology as applied in the economic field of agriculture to enable improvements in land management, irrigation performance, and crop productivity.

The irrigation analysis server 102, as illustrated, comprises a processor 104. The processor 104 is operably associated with a non-volatile memory/storage device 106 via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the irrigation analysis server 102.

The storage device 106 maintains program and data content required for operation of the irrigation analysis server 102. For example, the storage device 106 contains operating system programs and data, as well as other executable application software necessary for proper operation of the irrigation analysis server 102. Of particular relevance to implementation of the invention, the storage device 106 also contains specific program instructions which, when executed by the processor 104, cause the irrigation analysis server 102 to perform operations relating to an embodiment of the present invention. These specific program instructions comprise one or more computer programs or program modules developed in accordance with principles and algorithms embodying the invention, as described in greater detail below, and with reference to FIGS. 2 to 23, in particular. In operation, instructions and data held on the storage device 106 are transferred to volatile memory 110 for execution on demand.

The processor 104 is also operably associated with a communications interface 112 that facilitates access to a wide-area data communications network, such as the Internet 116.

As has been alluded to above, in operation the volatile storage 110 contains a corresponding body 114 of program instructions transferred from the storage device 106 and configured to perform processing and other operations embodying features of the present invention. The program instructions 114 comprise one or more computer programs or program modules making a technical contribution to the art, over and above well-understood, routine, and conventional activity in crop irrigation. These computer program modules must be developed and configured specifically to implement an embodiment of the invention as further described below, particularly with reference to FIGS. 2 to 23, which serve to illustrate the technical principles of the invention, and to assist skilled persons in putting these principles into practical effect.

In describing embodiments of the present invention, the terms 'processing unit' and 'module' are used in this specification to refer to a combination of hardware and software configured to perform a particular defined task. While acknowledging that other choices of tools and technology may be available, the present inventors have developed a particular embodiment of the invention which has been implemented substantially using the R programming language along with a number of available library packages. Despite this use of existing software libraries to carry out known functions, it will be appreciated by skilled persons that embodiments of the invention involve the use of these functions in conjunction with novel algorithms that are not well-understood, routine, or conventional in the art of crop irrigation. More generally, while pre-existing languages, frameworks, platforms, development environments, and code libraries may assist implementation, they require specific configuration and extensive augmentation (i.e. additional code development) in order to realize various benefits and advantages of the invention and implement the specific structures, processing, computations, and algorithms described below, particularly with reference to FIGS. 2 to 23. The descriptions, block diagrams, flowcharts, tables, and so forth, presented in this specification are accordingly provided to enable those skilled in the arts of software engineering, statistical modeling, and data analysis to understand and appreciate the features, nature, and scope of the invention, and to put one or more embodiments of the invention into effect by development of such program code.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Returning to the discussion of FIG. 1, the networked system 100 includes a cloud-based data server 118, which is configured for storage and retrieval of data required by the irrigation analysis server 102, such as satellite imagery, climate and weather data such as rainfall records, and so forth. This data may be stored in one or more databases, e.g. 120, operably associated with the data server 118.

Users may interact with the irrigation analysis server 102 via remote computing devices, e.g. 122. For example, the irrigation analysis server 102 may be configured to provide a web-based interface that can be accessed using web browser software executing on a computing device 122.

Figure 2:
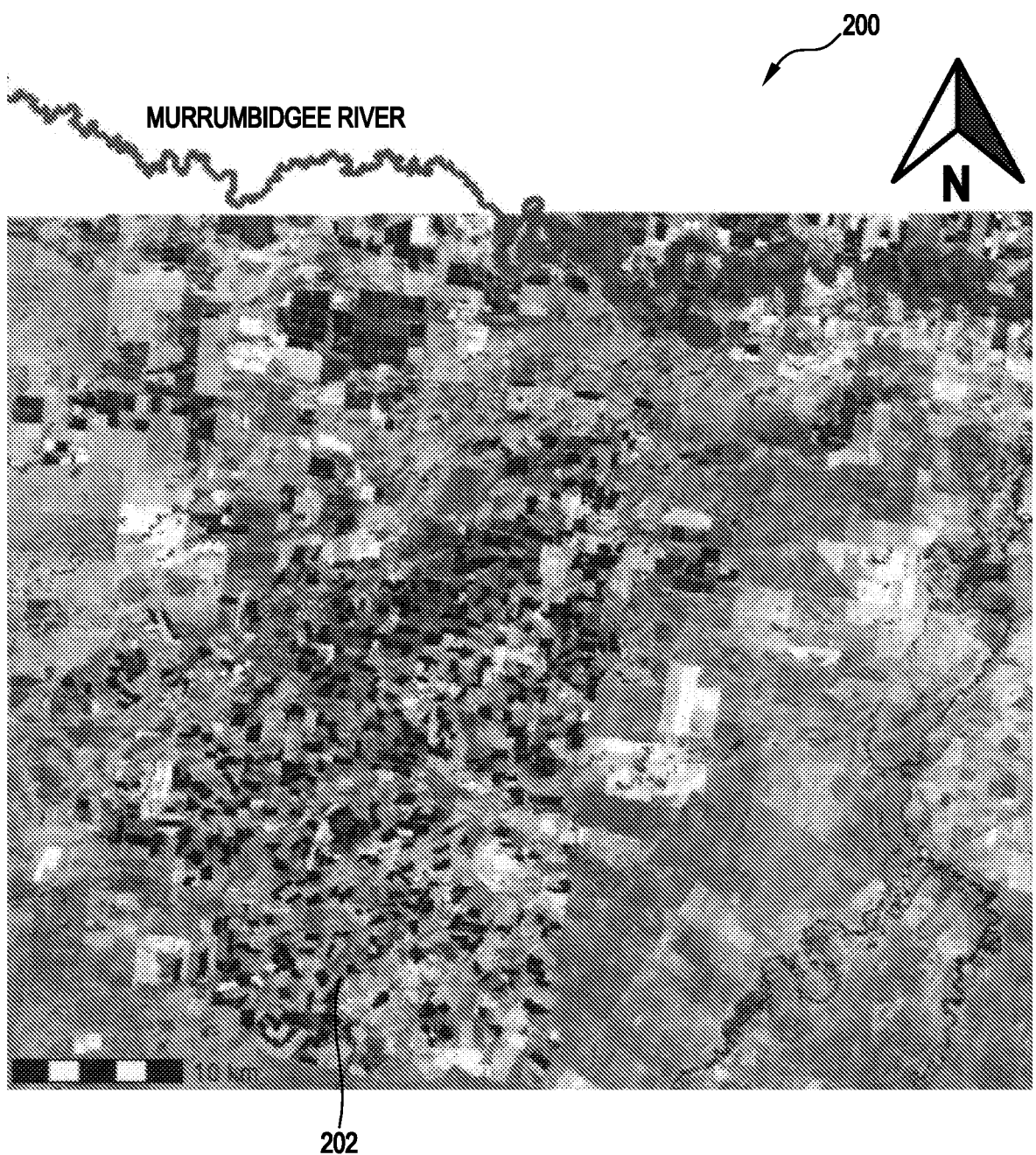
FIG. 2 shows an exemplary satellite image of a geographical region.

Computational methods embodying the invention will now be described with reference to FIGS. 2 to 23. An input to the method is digital imagery, such as satellite imagery, which can be retrieved by the irrigation analysis server 102, for example, from the database 120 via the data server 118. An exemplary satellite image 200 of a geographical region is shown in FIG. 2. The region shown, and used for illustrative purposes only in this description, includes the Coleambally Irrigation Area (CIA) 202. The CIA is a district with recently modernized and automated canal-based water delivery infrastructure, located in southern New South Wales, Australia. The district serves 79,000 hectares (ha) of irrigated land with approximately 500 farms that have an average farm size of 220 ha. The dominant irrigated fields are annual croplands, following by pasture lands and irrigated fruit trees. State forests and individual trees are scattered across the region and there are significant areas of dry-land grazing. The main irrigation season is in spring-summer-autumn from mid-August to mid-May.

The cropping year is defined as the period from the $1^{st}$ of October to the $30^{th}$ of September, while winter cropping season may extend to the end of November. The region is dominated by three types of annual cropping patterns over the study region: single summer cropping (October-April); single winter cropping (March-November); and double cropping (October-April, March-November). The average annual rainfall in CIA is around 410 mm with winter rainfall generally higher than summer rainfall, and the long-term average temperature is 24° C. The region experiences a hot and dry summer and a wetter and cool winter, with summer crops relying heavily on irrigation while winter crops can be either irrigated or rainfed. Typical summer crops include corn, cotton and rice while typical winter crops are wheat, canola and barley. In addition, winter is also the typical growing season for pasture.

Irrigation water in the CIA is delivered from the Murrumbidgee river through the main channels and supply channels to farms. The actual amount of water delivered to a farm/field in each season is capped by both a water license and water availability (i.e., the former is a cap of total irrigation water that a farm can order for any year, while the latter is the maximum irrigation water that can be ordered for a particular year). Therefore, the total seasonal water delivered to a farm can vary from year to year. Flood irrigation is the most common irrigation method in the CIA.

Figure 3:
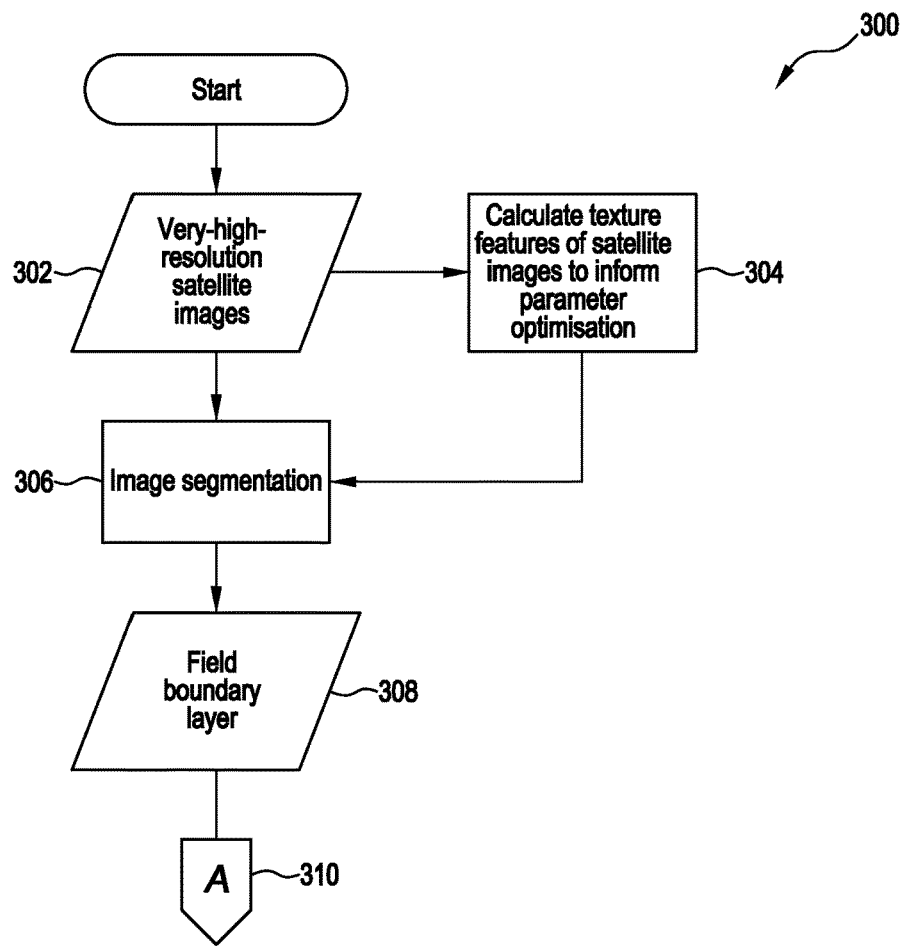
FIG. 3 is a flowchart illustrating a procedure for analysing digital imagery of the geographical region to identify a plurality of field areas delineated by field boundaries, according to an embodiment of the invention.

A first process implemented in embodiments of the invention comprises identifying boundaries of field areas within the geographical region. In some cases, field boundary information may already be available. For example, field boundary data may be provided by farmers, through prior surveys, and/or via previously completed automated analysis of digital imagery. Suitable field boundary data may therefore be accessible to the irrigation analysis server, for example for retrieval from the database 120. Embodiments of the invention may additionally be configured to perform automated analysis of digital imagery to identify field boundaries. To this end, FIG. 3 is a flowchart 300 illustrating a procedure for analysing digital imagery of the geographical region to identify a plurality of field areas delineated by field boundaries within the geographical region. Satellite imagery 302 is input to a step 304 that calculates texture features of the imagery that can be used to inform parameter optimisation in a further step 306 of segmenting the imagery to delineate field boundaries. In an exemplary embodiment, the field boundary delineation step 306 is implemented using a Feature Extraction (FX) module of ENVI® Image Processing & Analysis Software, available from L3Harris Geospatial of Boulder, Colorado, USA. The FX module employs an edge-based watershed transform algorithm for segmentation.

It has been found by the inventors that segmentation accuracy is mainly affected by a 'scale level' parameter in the FX module. However, optimum scale level values differ between individual fields, such that using a uniform parameter set over the entire region is undesirable. Optimum scale level values for individual fields also show large spatial variability within a small region, making it difficult to divide the image into sub-regions and apply segmentation separately. Manually optimising the scale level parameter for different fields is obviously impractical, and it is therefore desirable to provide an automated method.

Figure 4:
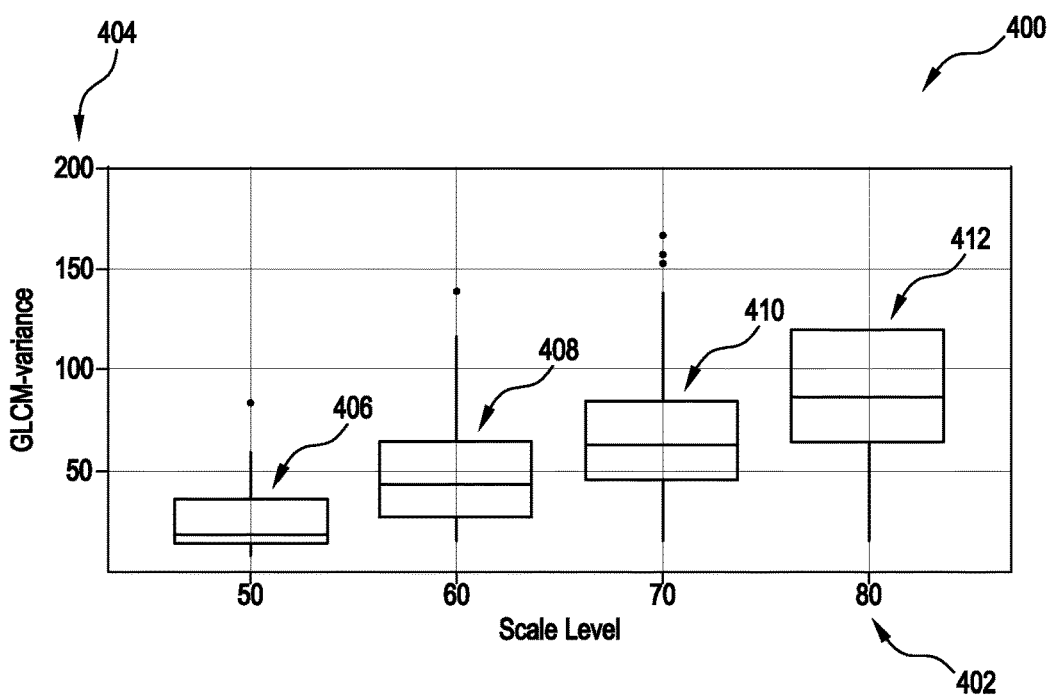
FIG. 4 shows a box plot comparing scale level parameter values against corresponding GLCM-variance values.

The method employed in step 304 of an exemplary embodiment comprises, for each field, computing a grey-level co-occurrence matrix (GLCM) to obtain a GLCM-variance value, and determining a scale level parameter value based on the GLCM-variance value. In particular, a GLCM is computed for each individual field for four segmentation layers separately, which includes properties such as mean, variance, homogeneity and entropy. In an exemplary embodiment, GLCMs are computed using the "glcm" package available for the R programming language. Through experimentation, the inventors have found that, among all GLCM variables, GLCM-variance has a strong positive correlation with scale level. FIG. 4 shows a box plot 400, having four values of scale level (50, 60, 70, 80) on the horizontal axis 402, against corresponding GLCM-variance values on the vertical axis 404 for test sample fields selected from four segmentation layers. The plotted data 406, 408, 410, 412 reveals a substantially monotonic relationship between the GLCM-variance value and the scale level parameter value. Based on this observed data, in an exemplary embodiment the scale level parameter value is determined according to a step-wise series of predetermined values as listed in Table 1.

TABLE 1

Scale level parameter values based on GLCM-variance

| GLCM-variance | Scale Level |
|---|---|
| <37 | 50 |
| 37-66 | 60 |
| 66-85 | 70 |
| >85 | 80 |

Figure 5:
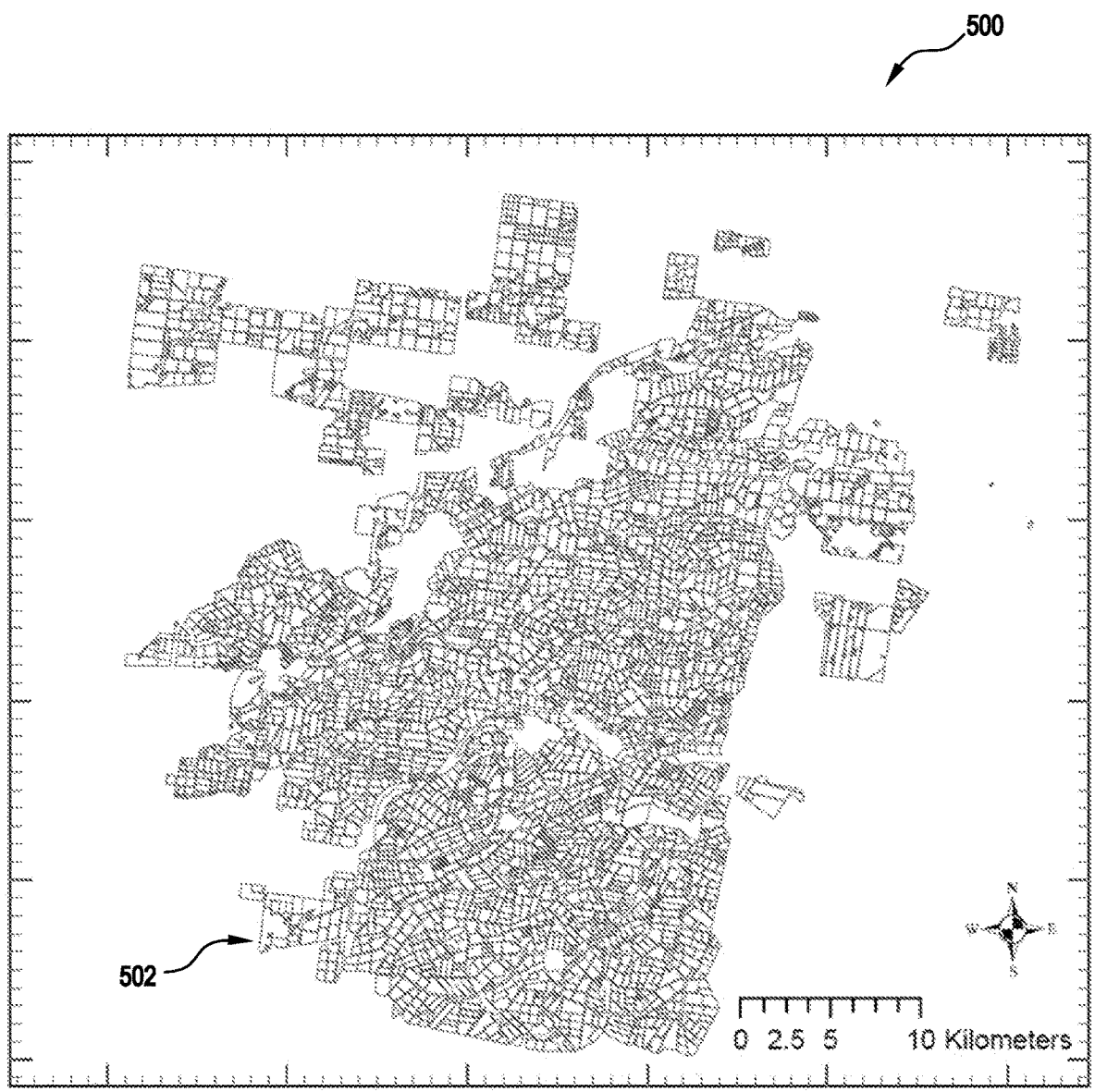
FIG. 5 shows an exemplary field boundary map resulting from a process/system embodying the invention.

In the exemplary embodiment, the 'merge level' parameter of the FX module is set to 90, while parameters are set to default values. The boundaries of each filed are delineated on one of four segmentation layers based on GLCM-variance. These are then merged into a completed field boundary map 308. Although texture information helps to improve segmentation accuracy, there may remain a small number of fields for which boundaries cannot be delineated accurately. In such cases, if desired, manual corrections may be applied after automatic segmentation. An exemplary field boundary map 500 for the CIA region 502, resulting from this process, is shown in FIG. 5.

Figure 6:
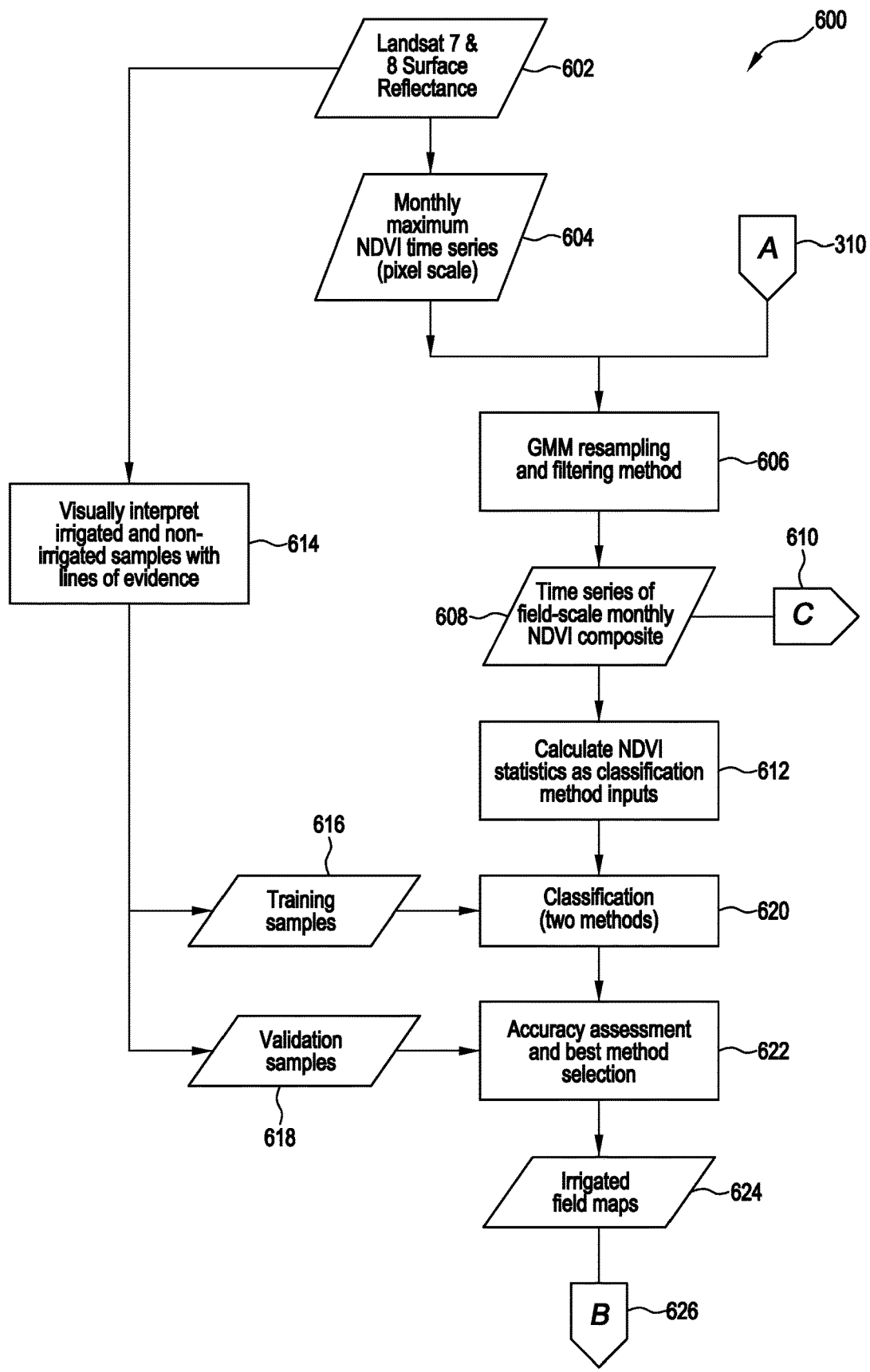
FIG. 6 is a flowchart illustrating a procedure for processing seasonal NDVI data to generate aggregate field NDVI feature values and classify irrigation status according to an embodiment of the invention.

FIG. 6 is a flowchart 600 illustrating a procedure for processing seasonal NDVI data to generate a set of aggregate field NDVI feature values for each identified field area, and classifying irrigation status of each identified field area by executing a decision tree classifier that is configured to determine a classification as either 'irrigated' or 'non-irrigated' based upon the corresponding set of aggregate field NDVI feature values. The process 600 has, as one input, the field boundary map 308 that is output at 310 from the process 300. A further input of the process 600 is satellite surface reflectance images 602 which are processed to produce pixel scale monthly maximum NDVI time series data 604.

In an exemplary embodiment, a method of processing seasonal NDVI data comprises firstly acquiring the NDVI time sequence 604, which comprises a plurality of NDVI images of the geographical region each captured at a corresponding capture time within a seasonal period. The method further comprises executing 606 a resampling algorithm to obtain representative NDVI values for each field area at each capture time within the seasonal period. In a preferred embodiment the resampling algorithm is a Gaussian Mixture Model (GMM) algorithm, as described in greater detail below with reference to FIGS. 7 and 8. Subsequently, a set of aggregate field NDVI feature values is calculated 612 for each field area using the representative NDVI values. The NDVI feature values are used as inputs to one of two alternative classification algorithms that are executed at step 620, and described in greater detail below with reference to FIGS. 10 to 15.

In an exemplary embodiment, the resampling GMM algorithm comprises a two-component GMM algorithm from which, for each field area, first and second clusters of NDVI pixel values are identified, and a representative NDVI value is computed for each field area. In particular, if the second cluster is more representative of the field area than the first cluster then the NDVI pixel values of the second cluster are used to compute the representative NDVI value. Alternatively, if the first cluster is more representative of the field area than the second cluster then the NDVI pixel values of the first cluster are used to compute the representative NDVI value. In the event that the clusters are not sufficiently distinct from each other, then all NDVI pixel values may be used to compute the representative NDVI value.

Figure 7:
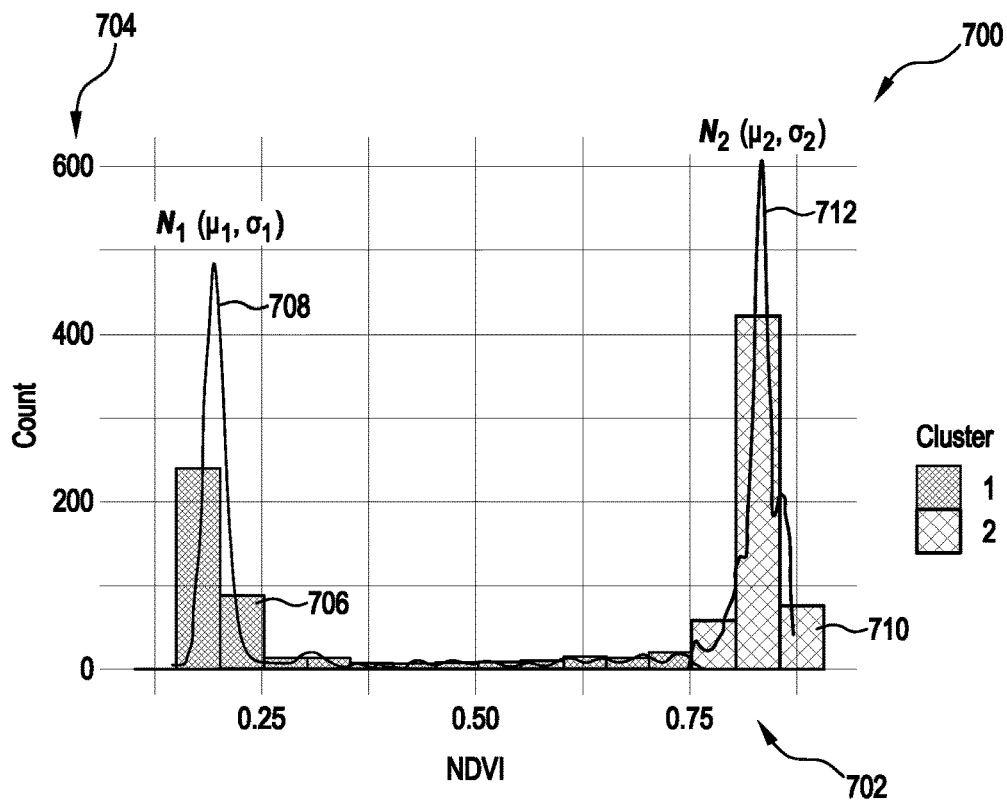
FIG. 7 shows a chart for a two-component GMM applied to NDVI pixel values of an exemplary field, according to an embodiment of the invention.

As is known, GMM is a probabilistic model that automatically assigns observations to a pre-defined number of clusters, assuming observations in each cluster following a Gaussian distribution. An example is illustrated in FIG. 7, which shows a chart 700 for a two-component GMM applied to NDVI pixel values of an exemplary field. The chart 700 is a histogram grouped by NDVI on the horizontal axis 702 of pixel counts on the vertical axis 704. Pixels within the histogram are grouped into a first cluster 706 with corresponding Gaussian fit 708 characterised by mean $\mu_1$ and standard deviation $\sigma_1$, and a second cluster 710 with corresponding Gaussian fit 708 characterised by mean $\mu_2$ and standard deviation $\sigma_2$.

Figure 8:
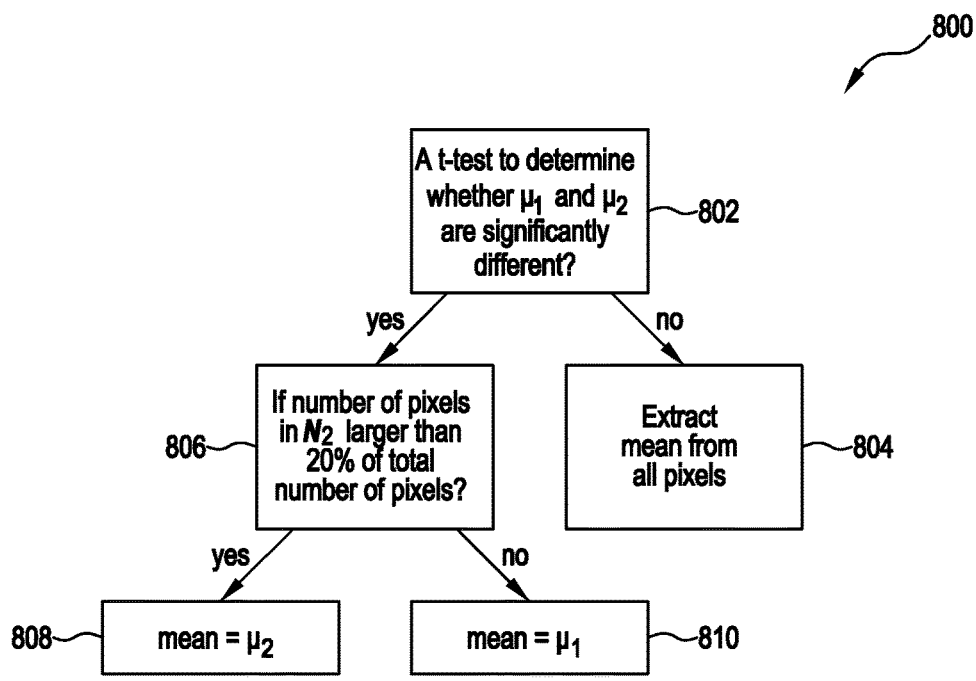
FIG. 8 is a flowchart of an exemplary method of computing a representative NDVI value according to an embodiment of the invention.

An exemplary method of computing a representative NDVI value is illustrated by the flowchart 800 of FIG. 8. At step 802, a t-test is applied to determine whether the difference between $\mu_1$ and $\mu_2$ is statistically significant. If not, then at step 804 an average of all NDVI pixels in the field area is computed to be the representative NDVI value. In the event that the difference is statistically significant then at step 806 the number of pixels in the second (higher mean) cluster is checked to determine whether it is larger than 20% of the total number of pixels. If so, then $\mu_2$ is selected at step 808 as the representative NDVI value. Otherwise, $\mu_1$ is selected at step 810 as the representative NDVI value. The threshold of 20% was determined to give priority to higher NDVI while also ensuring that fallow field is not assigned a deceptively high representative NDVI due to weeds or small patches of trees.

Figure 9:
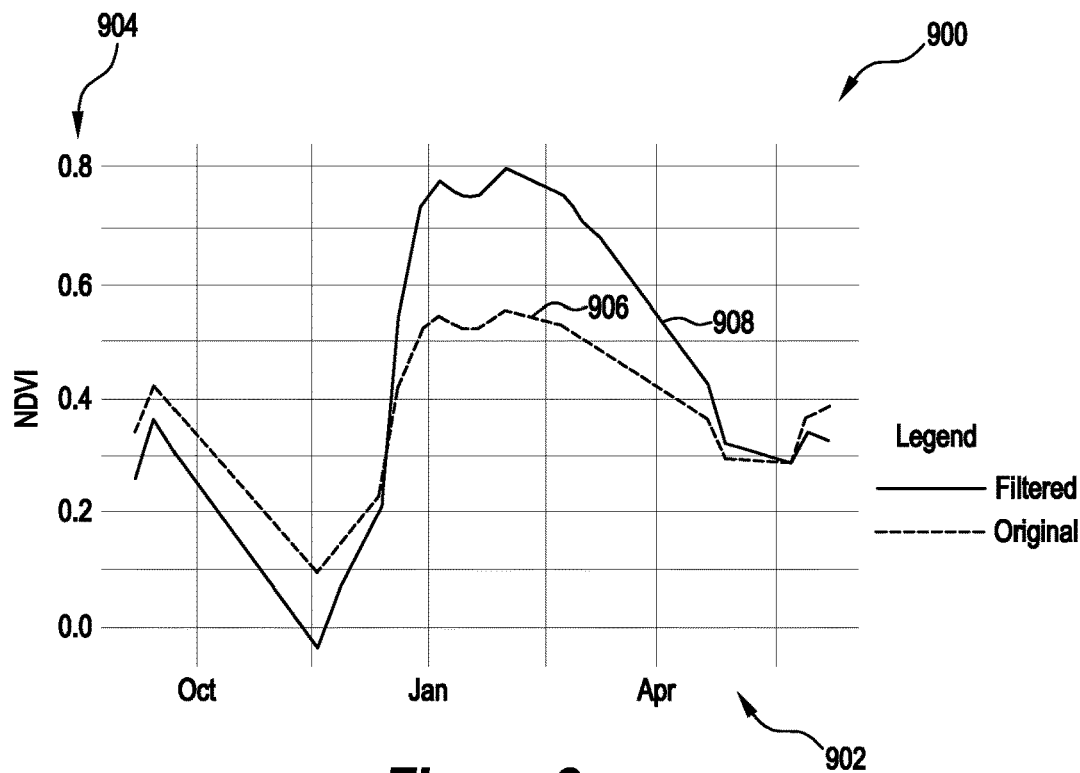
FIG. 9 is a chart illustrating performance of representative NDVI time series computed according to the method shown in FIG. 8.

FIG. 9 is a chart 900 illustrating the difference between representative NDVI time series' computed according to the method 800, as compared with a simple average of all pixels within an exemplary field area. The time (months) is shown on the horizontal axis 902, and computed representative NDVI on the vertical axis 904. The results of simple averaging are shown by the trace 906, while the results from the method 800 are shown by the trace 908. It is apparent that the representative NDVI time series obtained from averaging all pixels is affected by non-crop pixels in the field, which tends to 'wash out' the variations over the season, whereas the resampling GMM algorithm computes results that are more representative of the crop pixels in the field, creating stronger variations that can improve the accuracy of irrigated field classification.

The trace 908 of FIG. 9 comprises seasonal NDVI data that can be used to generate NDVI feature values for use in classifying field irrigation status, i.e. step 620 in FIG. 6. Depending upon the classification algorithm, different sets, or vectors, of NDVI feature values may be computed. An exemplary set of NDVI feature values that may be used is listed in Table 2.

TABLE 2

List of exemplary NDVI feature values

| FEATURE NAME | DESCRIPTION |
| --- | --- |
| MAX | The maximum of the representative NDVI values over all capture times within the seasonal period. [1] |
| RANGE | The range of the representative NDVI values, calculated using a difference between a maximum and a minimum of the representative NDVI values over all capture times within the seasonal period. Note if the Minimum NDVI is less 0.2, use 0.2. |
| MONTHLY-NDVI VALUE | The representative NDVI values at each capture time within the seasonal period. |
| AVERAGE MAX VALUE | An average of a selected group of the representative NDVI values from the capture times within the seasonal period. For example, the average of the first three max NDVI values from Mar to Nov |
| MIN VALUE | A minimum of the representative NDVI values over all capture times within the seasonal period. For example, the minimum NDVI value from Mar to Nov. |
| MONTH ABOVE THRES | A set of categorical values indicating whether or not the representative NDVI values at each capture time within the seasonal period is above or below a predetermined threshold. For example, logical numbers to describe if the monthly-NDVI value is above the threshold (0.6). If the value is greater than the threshold, returns 1; otherwise 0. Final output is a nine-element logical string. |
| Q_80_TIME | One or more values indicative of a sub-period of capture times within the seasonal period during which the representative NDVI values are within a predetermined upper quantile. In this example, the time when monthly-NDVI is above 80% quantile. Time may be described using index (e.g. Mar-Nov equals index 1-9). If multiple months are selected, the mean index may be used. |

TABLE 2-continued

List of exemplary NDVI feature values

| FEATURE NAME | DESCRIPTION |
| --- | --- |
| Q_20_TIME | One or more values indicative of a sub-period of capture times within the seasonal period during which the representative NDVI values are within a predetermined lower quantile. In this example, the time when monthly-NDVI is below 20% quantile. Time may be described using index (e.g. Mar-Nov equals index 1-9). If multiple months are selected, the mean index may be used. |
| PEAKOV0.8 PEAKOV0.7 PEAKOV0.6 PEAKOV0.5 | One or more values indicative of a number of capture times within the seasonal period during which the representative NDVI values are above a predetermined value. In this example, the predetermined values are 0.5, 0.6, 0.7 and 0.8. |
| LARGEST GROWTH RATE | One or more values calculated from a difference between a selected pair of the representative NDVI values from the capture times within the seasonal period. In this example: maximum NDVI growth, defined as the maximum difference of two neighboring monthly-NDVI values ($NDVI_{i+1}$–$NDVI_i$) |
| DIFF2_3 | difference between the second largest monthly-NDVI and the third largest monthly-NDVI |

Figure 10:
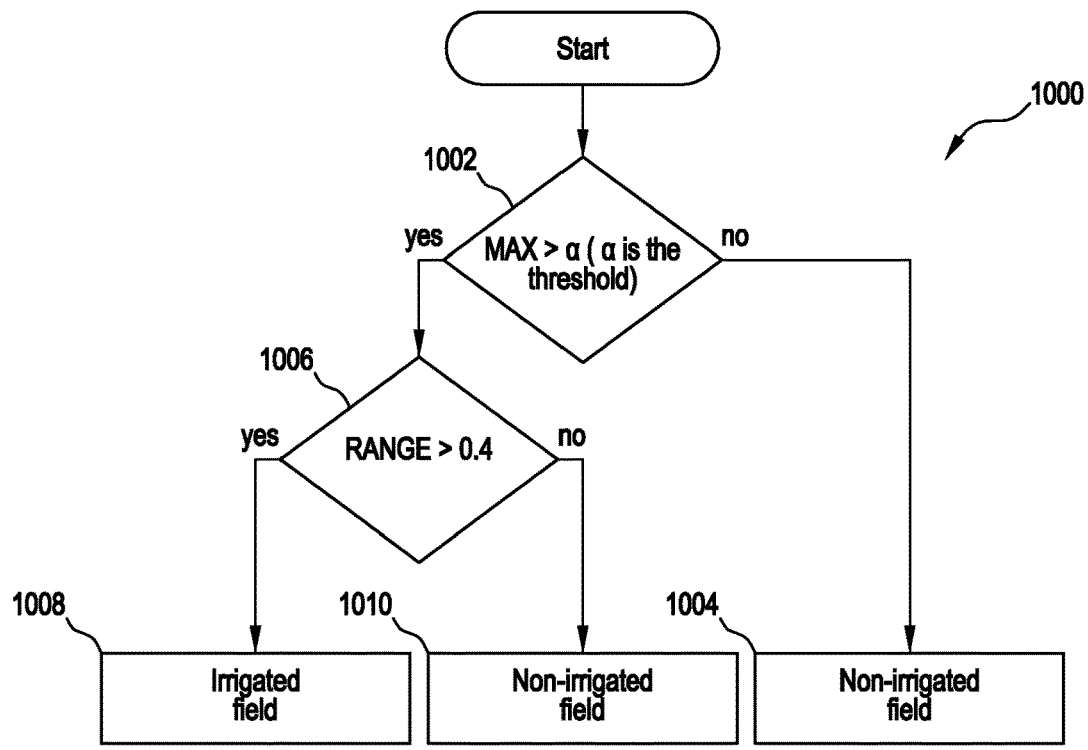
FIG. 10 illustrates a decision tree classifier comprising a single tree embodying the invention.

Note:
[1] Maximum NDVI is extracted from December to February for summer and June to October for winter In one embodiment, the vector of NDVI feature values comprises the two values MAX and RANGE, and the decision tree classifier comprises a single tree 1000 with a depth of two, as illustrated in FIG. 10. Execution of the decision tree classifier comprises determining, at a first split 1002, whether the maximum (MAX) of the representative NDVI values is greater than a threshold maximum NDVI value $\alpha$. If not, then the corresponding field area is classified 1004 as 'non-irrigated'. Otherwise, at a second split 1006, the decision tree comprises determining whether the range (RANGE) of the representative NDVI values is greater than a threshold NDVI range value, which in an exemplary embodiment is set at 0.4. If so, then the corresponding field area is classified 1008 as 'irrigated'. Otherwise, the corresponding field area is classified 1010 as 'non-irrigated'.

The threshold maximum NDVI value $\alpha$ may comprise a fixed value, e.g. 0.6. Preferably, however, the threshold maximum NDVI value $\alpha$ is dynamically determined. Advantageously, using a dynamic threshold may enable embodiments of the invention to better adapt to variations over time, e.g. between different seasons and/or years. In an exemplary embodiment, the dynamic threshold maximum NDVI value is computed by executing a threshold determination GMM algorithm. More particularly, the exemplary implementation comprises a k-component GMM algorithm, wherein the number of components, k, is determined by applying Bayesian Inference Criteria (BIC) to optimise a fit of the GMM model to a distribution of the maximum representative NDVI values, whereby each of the maximum representative NDVI values is allocated into an i-th cluster of k total clusters. The distribution of values in each cluster is modelled as a Normal distribution $N_i(\mu_i, \sigma_i)$.

Figure 11:
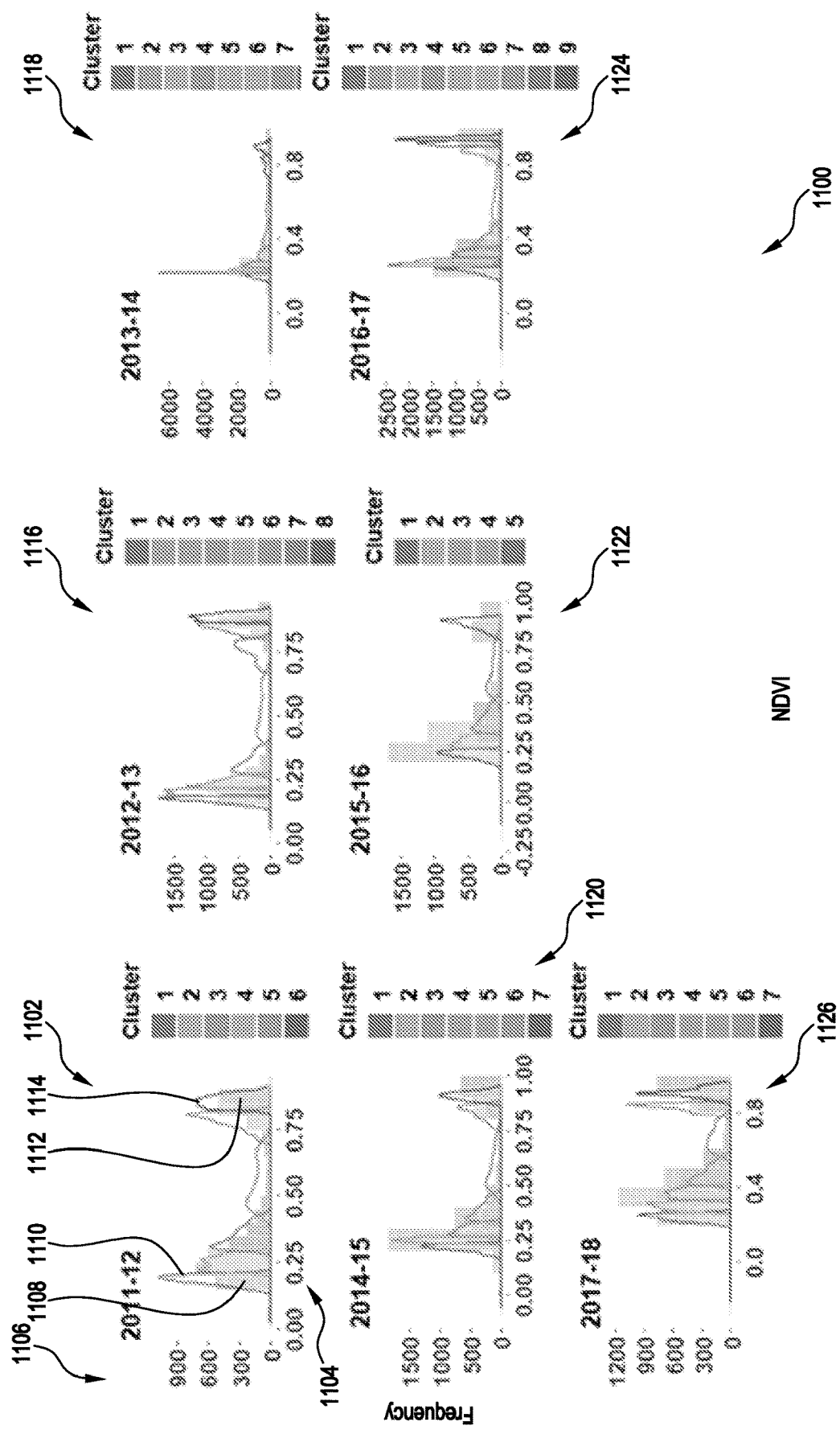
FIGS. 11 and 12 show charts illustrating threshold determination of a GMM algorithm embodying the invention, for summer and winter seasons respectively.
Figure 12:
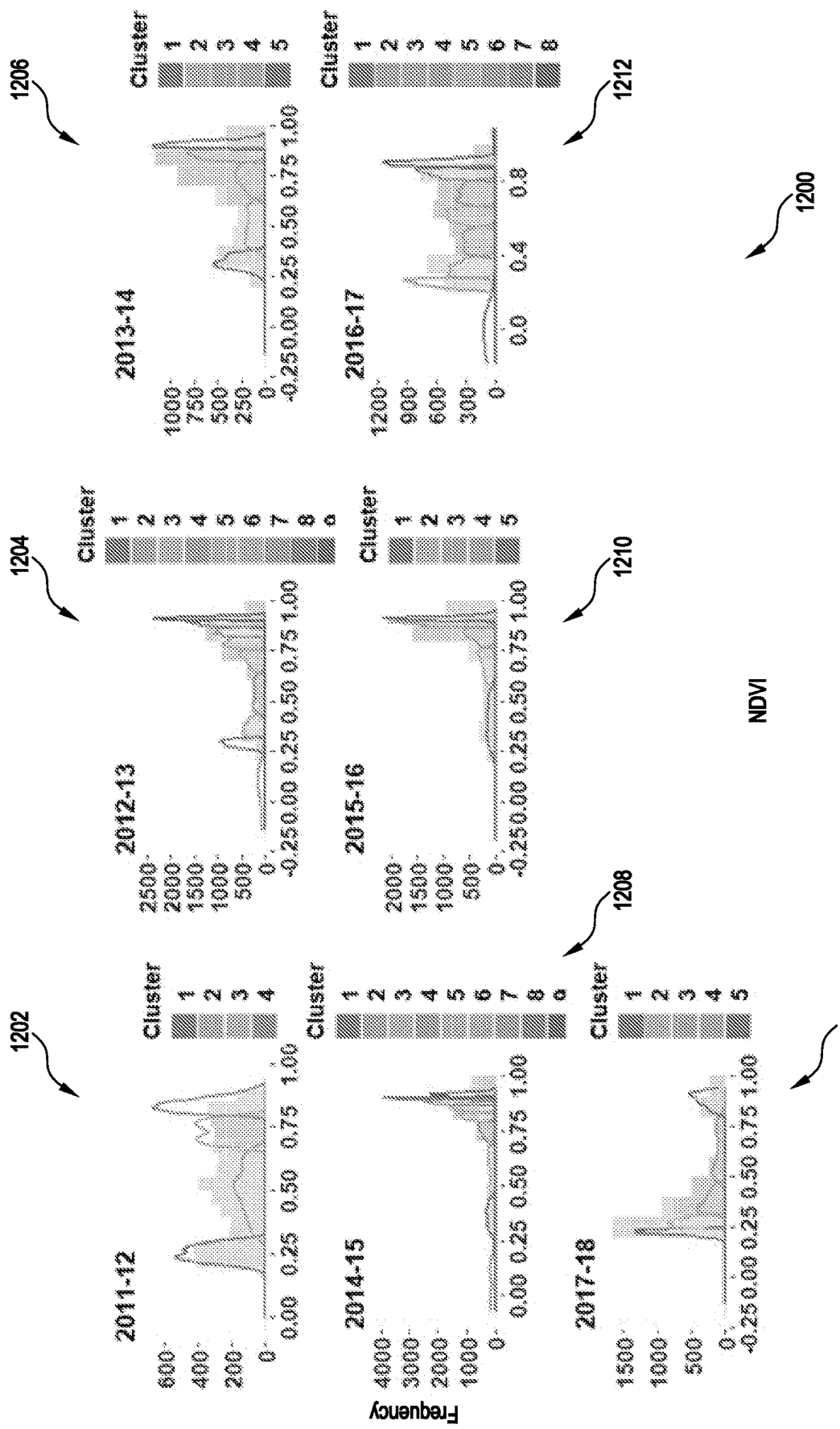

The threshold determination GMM algorithm is illustrated via the charts shown in FIGS. 11 and 12. FIG. 11 shows charts 1100 for summer seasons, and FIG. 12 shows charts 1200 for winter seasons, and each figure shows charts over a number of consecutive years. For each season of each year, a dataset consisting of maximum representative NDVI values are determined for all fields is computed. For example, the first chart 1102 (for summer 2011-12) shows a histogram grouped by maximum representative NDVI values on the horizontal axis 1104 of field counts on the vertical axis 1106. In the chart 1102 six clusters have been identified by applying BIC, from a first cluster 1108 with corresponding Gaussian fit 1110 characterised by mean $\mu_1$ and standard deviation $\sigma_1$, to a sixth cluster 1112 with corresponding Gaussian fit 1110 characterised by mean $\mu_6$ and standard deviation $\sigma_6$. Similar charts for summer seasons 1116-1126, and for winter seasons 1202-1214, have between four and nine identified clusters.

In each year/season, the threshold determination GMM algorithm further comprises reassigning the maximum representative NDVI values of the k clusters to first and second derived clusters have corresponding mean values $\mu_{d1}$ and $\mu_{d2}$, and corresponding standard deviations $\sigma_{d1}$ and $\sigma_{d2}$. An exemplary method of reassignment comprises computing a reassignment quantile for each cluster i of the k clusters. The maximum representative NDVI values of clusters for which the reassignment quantile is less than a reassignment threshold is then reassigned to the first derived cluster. The maximum representative NDVI values of clusters for which the reassignment quantile is greater than or equal to the reassignment threshold is reassigned to the second derived cluster. The dynamic threshold maximum NDVI value is computed based upon statistical parameters of the first and second derived clusters, e.g. $\mu_{d1}$, $\mu_{d2}$, $\sigma_{d1}$ and $\sigma_{d2}$.

Specifically, in an exemplary embodiment a 5% quantile of each cluster (left tail) is calculated, and clusters for which 5% quantile are, respectively, above and below 0.6, are combined to form the two derived clusters. The comparison with 0.6 thus further divides clusters into two populations, representing irrigated and non-irrigated fields. The choice of a 5% quantile in the exemplary implementation is based on an assumption that if more than 95% of pixels in one cluster are above 0.6 (which also means that most of the fields in this cluster have reached high NDVI within the season), it is likely that the cluster represents irrigated fields.

In alternative embodiments, the decision tree classifier comprises a random forest machine learning (RFML) model that is preconfigured to take the set of aggregate field NDVI feature values of an identified field area as input, and to generate an output value indicative of whether the identified field area is 'irrigated' or 'non-irrigated'. In an exemplary implementation, the NDVI feature vector comprises all 14 of the feature values listed in the table above. Advantageously, an RFML model is able to classify high-dimensional data with good accuracy and efficiency.

Preconfiguring the RFML model comprises training the RFML model in a supervised training mode using training data consisting of a plurality of training sets of aggregate field NDVI feature values and corresponding label values identifying each training set of aggregate field NDVI feature values as either 'irrigated' or 'non-irrigated'. In an exemplary embodiment, an innovative method of compiling training samples is employed to generate a training sample pool having distinct categories of 'static' and 'dynamic' fields. Advantageously, it is thus possible to update only the 'dynamic' samples for different time periods, i.e. seasons and/or years, thereby significantly reducing the processing required for retraining the RFML model to account for variations over time. In this case, model re-calibration using the training sample pool was performed automatically every season and classification rules were adjusted in response to the changing climatic conditions across years, as described in greater detail below with reference to FIGS. 13A, 13B, 13C and 14. An exemplary embodiment has been implemented in the R programming language using the package "randomforest".

The training data set was obtained firstly by identifying irrigated and non-irrigated samples via visual interpretation of satellite imagery. Visual interpretation is an efficient sample collection method compared to on-field collection, assuming irrigation status can be verified using robust lines of evidence. The auxiliary data used for visual interpretation included Landsat 8 false-color composites, monthly NDVI time series, very-high-resolution images on Google Earth and field trip information.

As has been observed, a concern in multi-year classification is that the crop phenology (NDVI time series) for some samples varies dramatically across time, which makes a model trained in one year not applicable in other years. One possible solution is to re-calibrate the model using samples from different years, but the sample recollection and model re-calibration is a time-consuming process. To mitigate this problem, NDVI time series of samples from different classes have been reviewed to determine which class(es) have high variations in NDVI profile across years. Classes having consistent NDVI time series across years have been categorised as 'static' classes, which can be kept unchanged in the training sample pool. Classes having NDVI time series that change dramatically across years have been categorised as 'dynamic' classes, and samples in those classes need to be updated when model training is applied in different years.

Figure 13A:
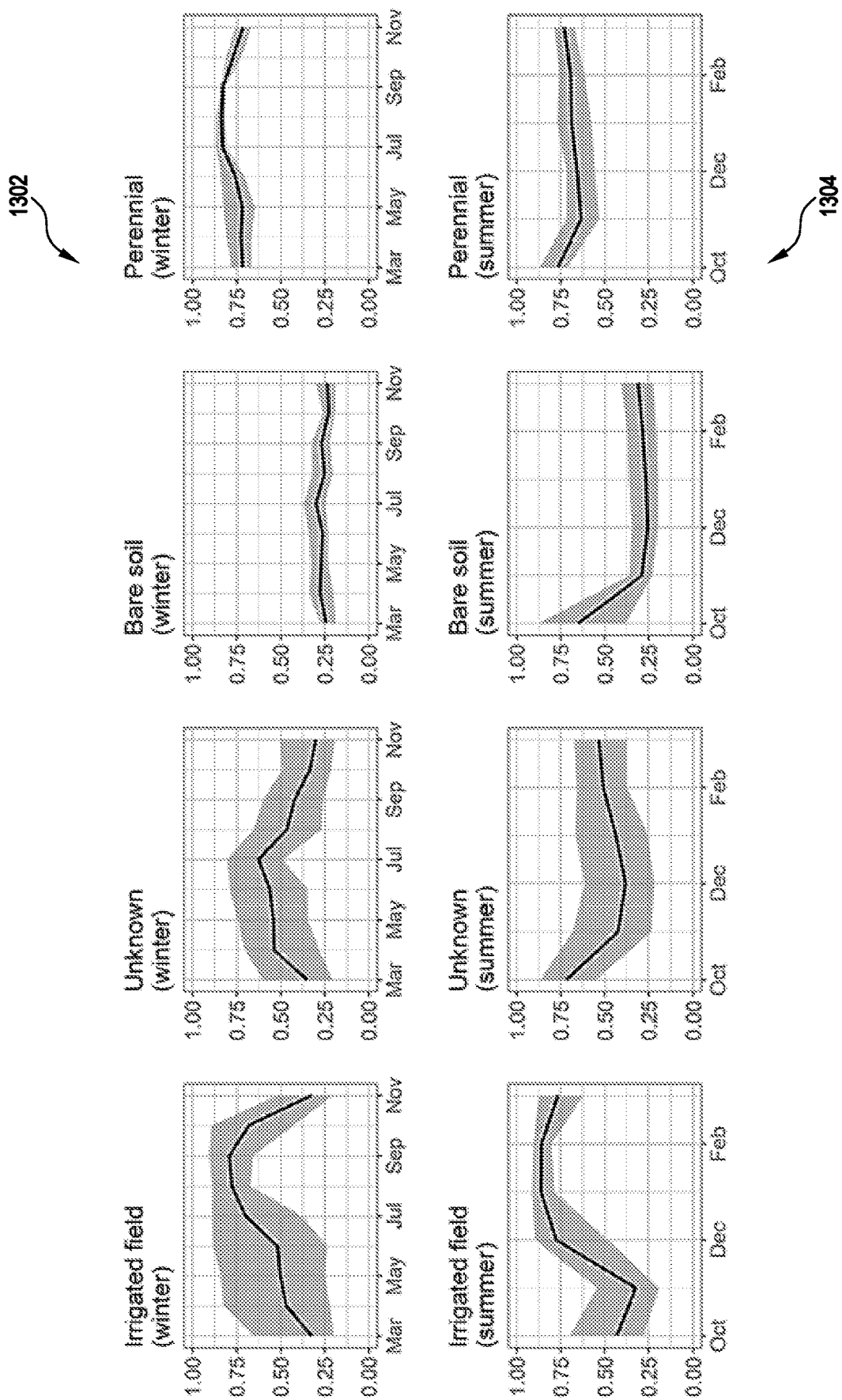
FIGS. 13A, 13B and 13C show exemplary sets of time series data for various classes of observed fields.
Figure 13B:
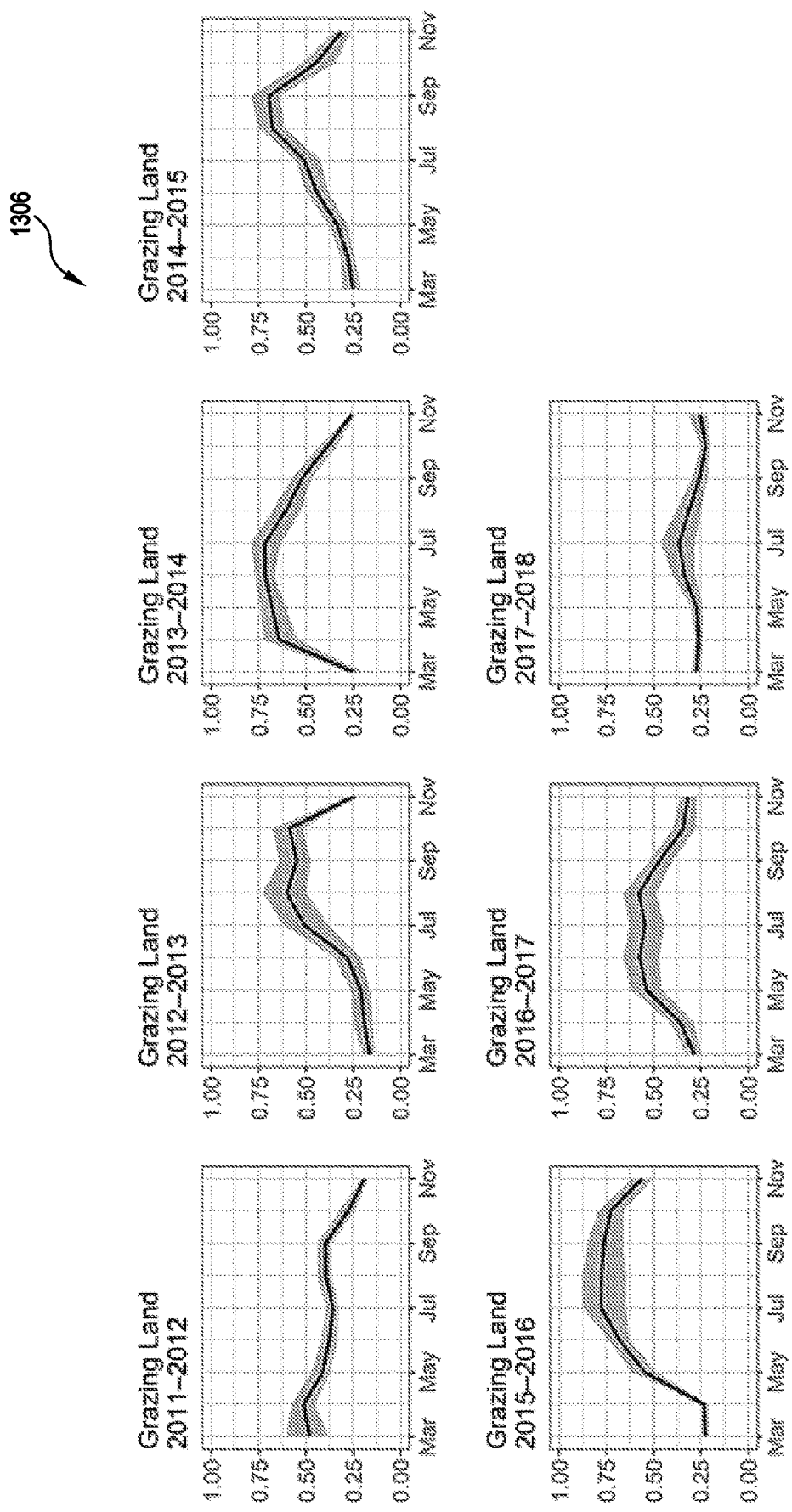
Figure 13C:
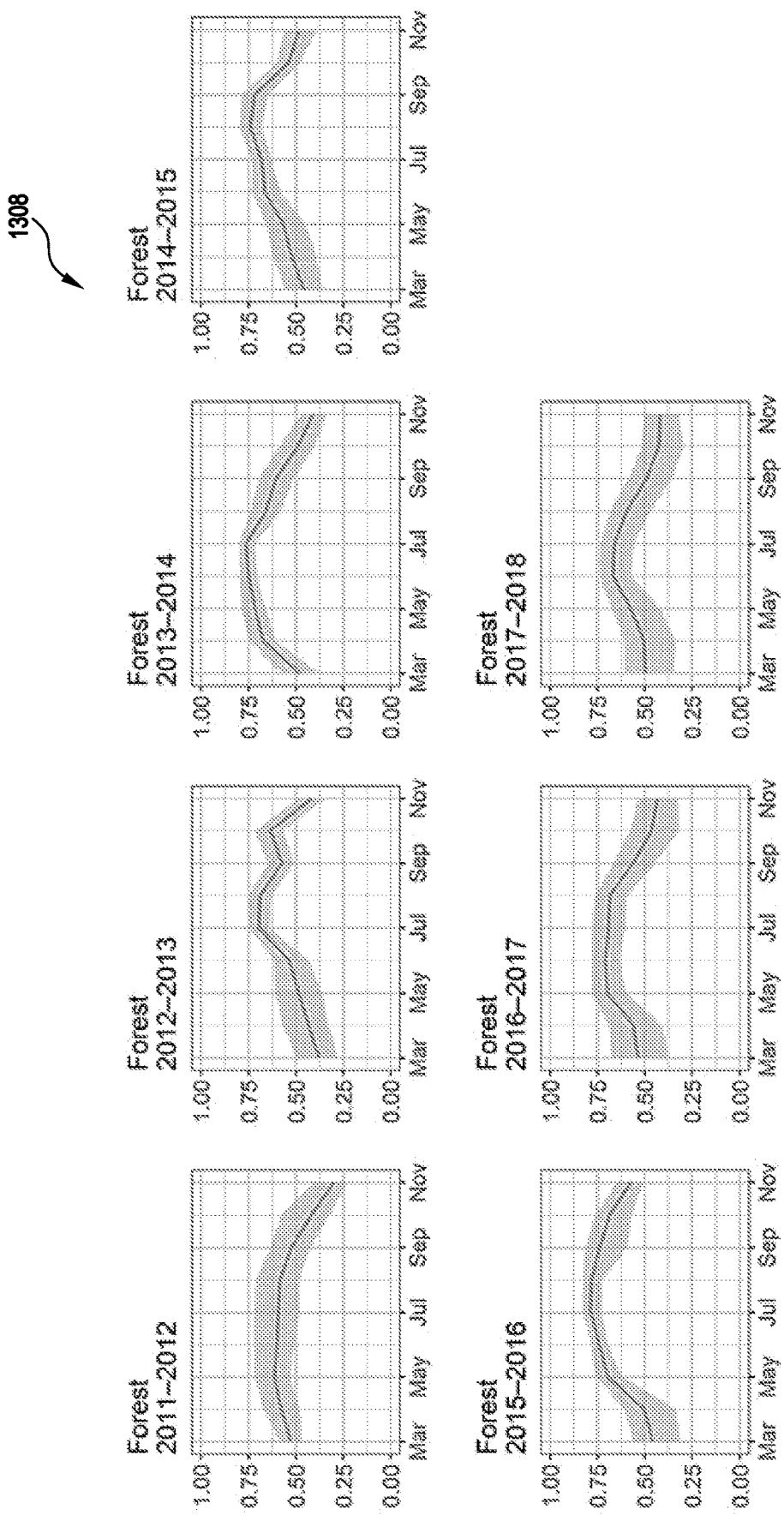

FIGS. 13A, 13B and 13C show exemplary sets of time series data for various classes of observed fields. Four static classes have been identified for winter 1302 and summer 1304, namely "irrigated cropping and pasture", "unknown", "bare soil", "perennial plantation", as shown in FIG. 13A. Two dynamic classes have been identified, namely "non-irrigated grazing land" 1306 (FIG. 13B) and "forest" 1308 (FIG. 13C). These categorisations have been based on observation of field-level NDVI time series and expert knowledge. Dynamic samples are only used for winter classification when non-irrigated grazing land and forest fields could be potentially misclassified as irrigated fields (e.g., it may be seen in the time series charts 1306 that the NDVI time series of non-irrigated grazing land in 2013-14 is similar to irrigated fields). In summer, non-irrigated grazing land and forest fields are clearly distinguishable from irrigated fields (cf. time series charts 1304 and 1306) and thus do not need to be established as separate classes.

Figure 14:
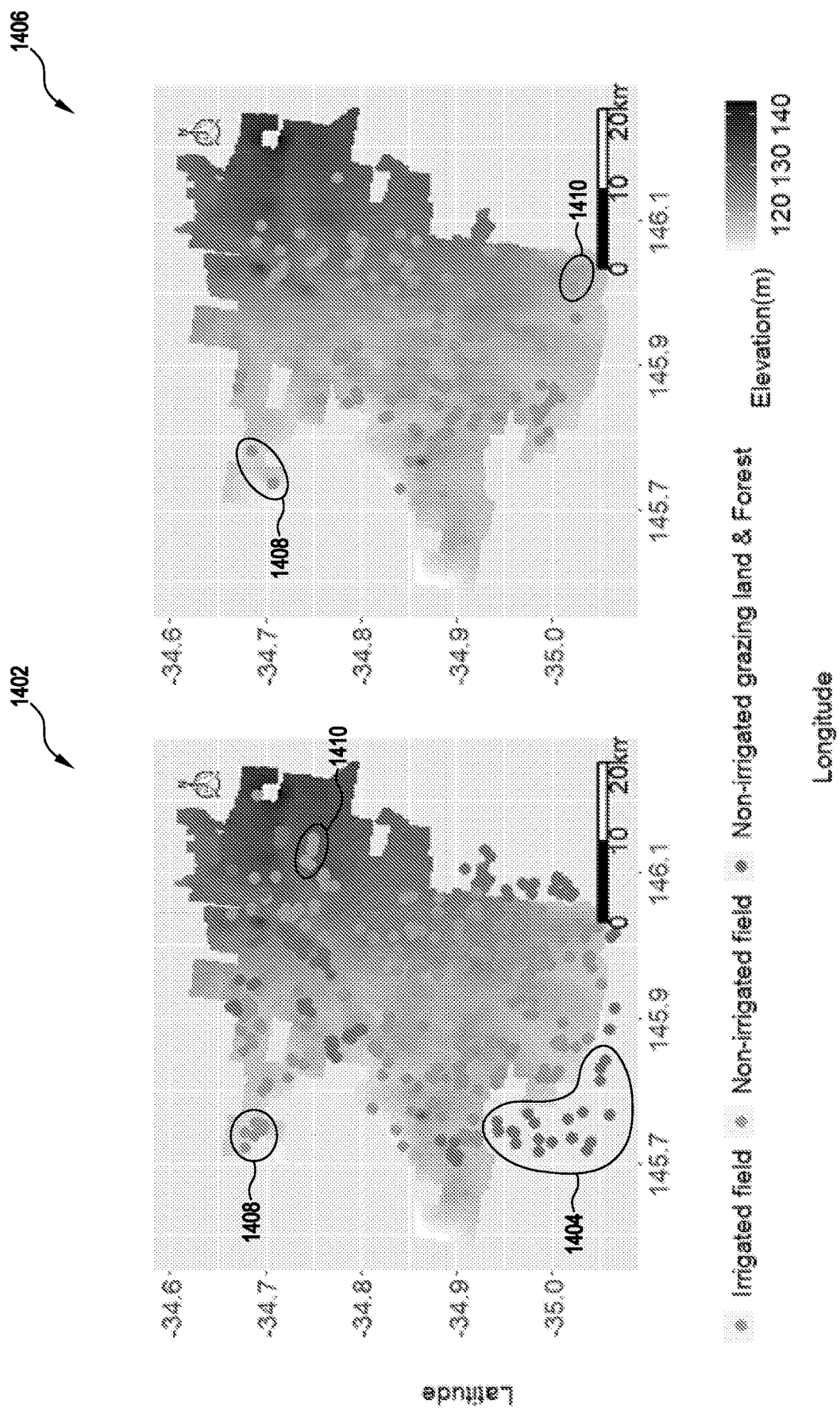
FIG. 14 illustrates locations from which training samples for an RFML model have been drawn in an exemplary embodiment of the invention.

FIG. 14 illustrates the locations from which training samples have been drawn in the exemplary embodiment. Training samples have been collected from a climatic normal year (2013-14) and a dry year (2011-12) for summer 1402 and winter 1406 seasons respectively. Samples include grazing land and forest locations 1404, non-irrigated fields 1408, and irrigated fields 1410. Samples from the static classes, once collected from the within the CIA, are kept unchanged in the sampling pool. Samples from the dynamic classes are collected from the region surrounding the CIA or from pre-defined state forest areas on Google Map. Dynamic samples are collected from the surrounding region, e.g. samples 1404, because the functions of these fields are permanent (e.g., non-irrigated grazing lands often maintain the same land use across years). In this case, it is necessary only to update the data for these fields when training on a different year, without re-selecting fields from new locations. Training sample numbers are summarised in Table 3, where the percentage of irrigated and non-irrigated classes in the training samples are controlled to correspond approximately with the actual percentage across the region to avoid bias in the training process.

TABLE 3

Summary of training sample numbers

| | Irrigated cropping fields | Bare soil | Non-irrigated grazing | Forest | Perennial plantations | Unknown |
|---|---|---|---|---|---|---|
| Summer | 55 | 25 | — | — | 13 | 40 |
| Winter | 147 | 35 | 49 | 52 | 4 | 48 |

Figure 15:
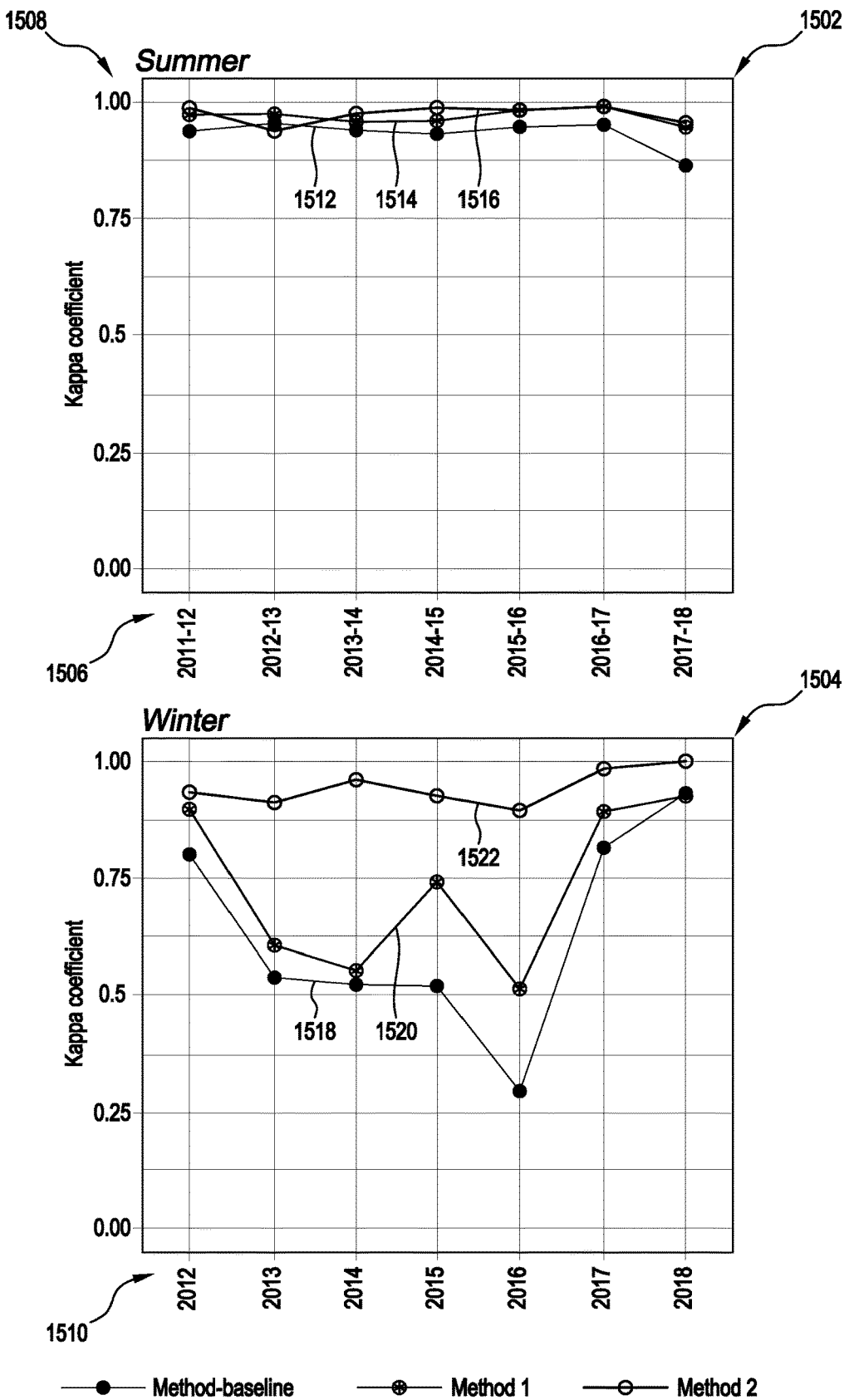
FIG. 15 shows charts for winter and summer seasons respectively comparing the performance of two alternative classification algorithms embodying the invention.

Returning to FIG. 6, the samples generated as described above may be used as training samples 616 and validation samples 618. The training samples can be used to train the RFML model for classification, and thus to compare 620 the performance of different classification methods. FIG. 15 shows charts 1502, 1504 for summer and winter seasons respectively comparing the performance of two alternative classification algorithms, plus a baseline. The baseline uses the single tree classifier with a fixed threshold of 0.6, and is compared with the single tree classifier using a dynamic threshold, and the trained RFML classifier. Performance is evaluated using Cohen's kappa coefficient of inter-rater reliability. For southern hemisphere summer, the years spanned by each season are shown on the horizontal axis 1506, with kappa on the vertical axis 1508. For winter, the horizontal axis 1510 shows the year. For the summer seasons, all classifiers perform reasonably well. Overall, however, the baseline fixed threshold classifier has the worst performance 1512, while the dynamic threshold classifier 1514 and the RFML classifier 1516 show better performance. For the winter seasons, performance of all three classifiers is generally worse than for summer, with greater differences among the classifiers: the baseline has the worst performance 1518, followed by the dynamic threshold classifier 1520, while the RFML classifier clearly shows superior performance across all years.

Overall, it can be observed that the RFML classifier has the best accuracy, with kappa coefficients exceeding 0.9 in all tested years for both summer and winter classification. The dynamic threshold classifier performs well in summer, but has inferior performance in winter. Accuracy of the baseline method is restricted by the fixed decision rules under different climate conditions, leading to very poor performance in some years (e.g., winter in 2016). An accuracy assessment 622 results, in this embodiment, in selection of the RFML classifier to generate irrigated field maps 624 (see FIG. 6).

Figure 16:
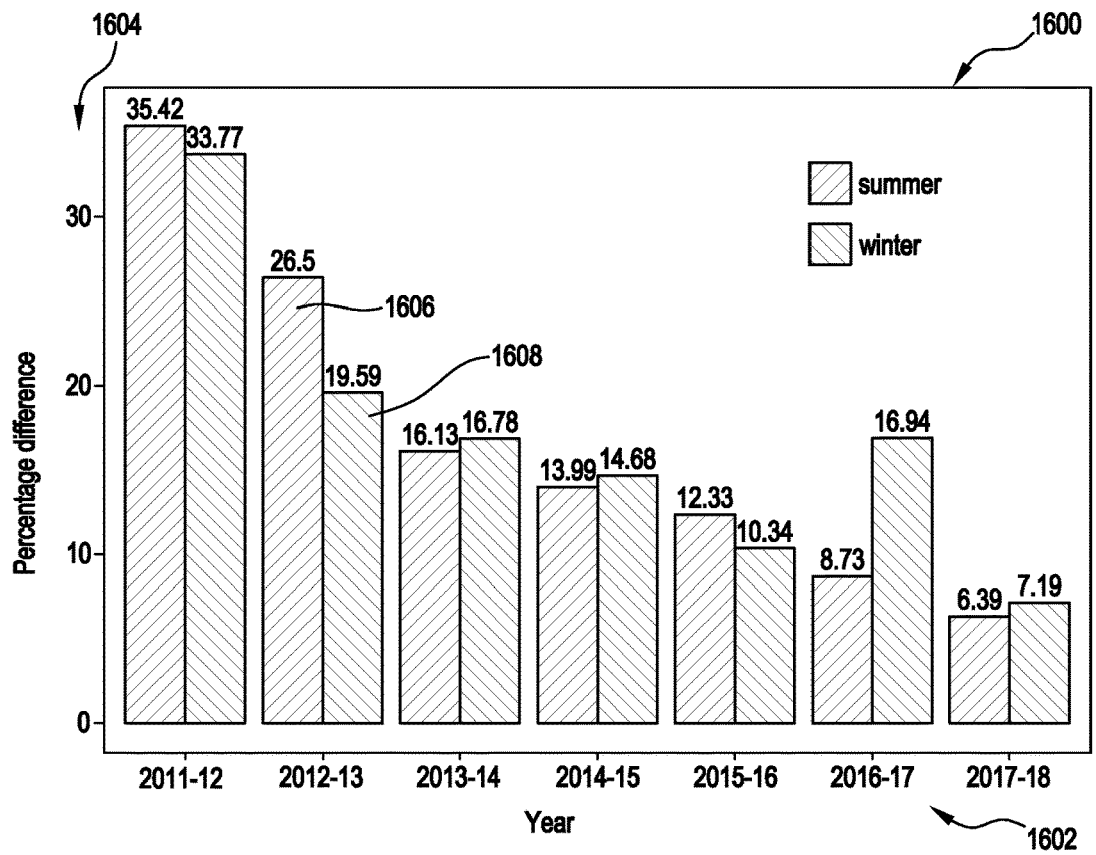
FIG. 16 is a chart showing differences between two methods embodying the invention in the proportions of irrigated fields identified.
Figure 18:
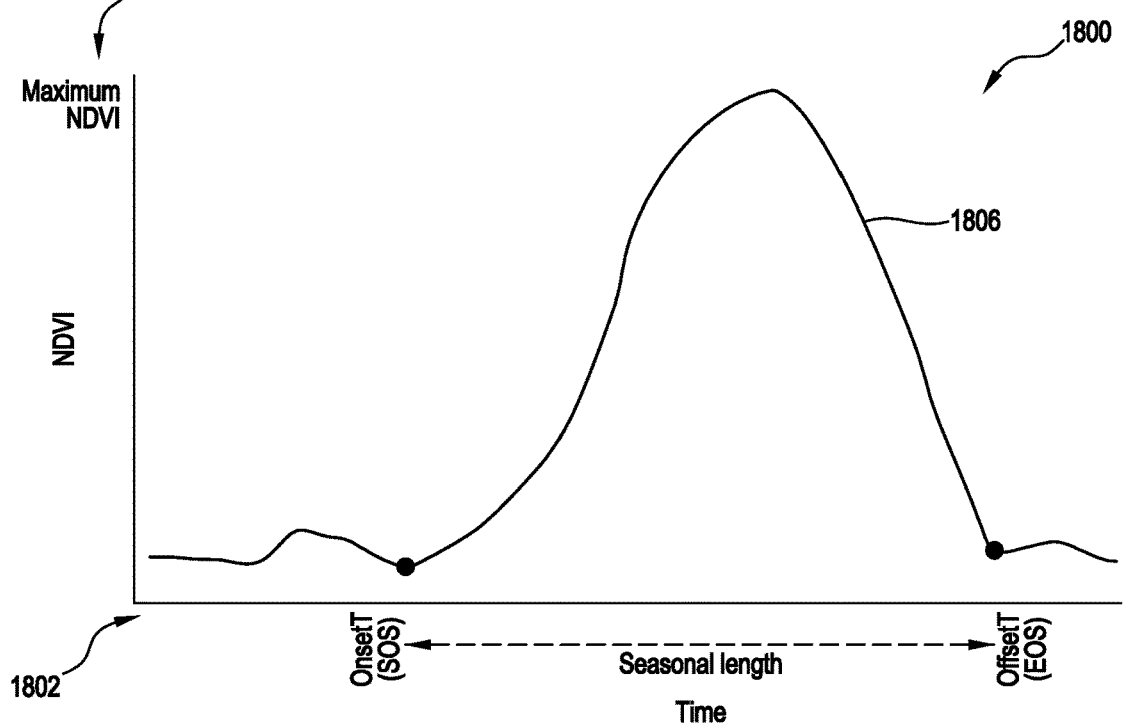
FIG. 18 is a chart showing a typical form of NDVI time series across a growing season.

To evaluate the benefits of the GMM resampling algorithm in improving classification accuracy, a comparison with simple averaging of all field pixels has been conducted using the RFML classifier. FIG. 16 is a chart 1600 showing differences between the two methods in the proportions of irrigated fields identified. Considering the high accuracy of the RFML classifier using the GMM resampling algorithm, as shown in FIG. 15, a majority of differences shown in FIG. 16 correspond with errors occurring when simple pixel averaging is used. In the chart 1600, the horizontal axis 1602 shows the year, while the vertical axis 1604 represents percentage difference. For each year, there are two columns corresponding with summer, e.g. 1606, and winter, e.g. 1608, seasons. It can be observed that employing the GMM resampling algorithm can substantially improve classification accuracy. Further details of the comparison, separating omission errors (i.e. misclassification of irrigated fields as non-irrigated) and commission errors (i.e. misclassification of non-irrigated fields as irrigated) are shown in Table 4. The results indicate that the GMM resampling algorithm avoids up to 32.3% of omission errors.

TABLE 4

Error comparison of classifier using GMM-resampling versus pixel averaging

| | Summer | | Winter | |
|---|---|---|---|---|
| Year | Omission Error | Commission Error | Omission Error | Commission Error |
| 2011-12 | 32.30% | 0% | 32.10% | 0.20% |
| 2012-13 | 22.70% | 0% | 17% | 0.50% |
| 2013-14 | 11.90% | 0% | 14.70% | 0.20% |
| 2014-15 | 10% | 0% | 13.10% | 1.10% |
| 2015-16 | 11.90% | 0% | 14.20% | 5.10% |
| 2016-17 | 7.30% | 0% | 17.20% | 0.50% |
| 2017-18 | 6.70% | 0% | 9.40% | 0.30% |

Figure 17:
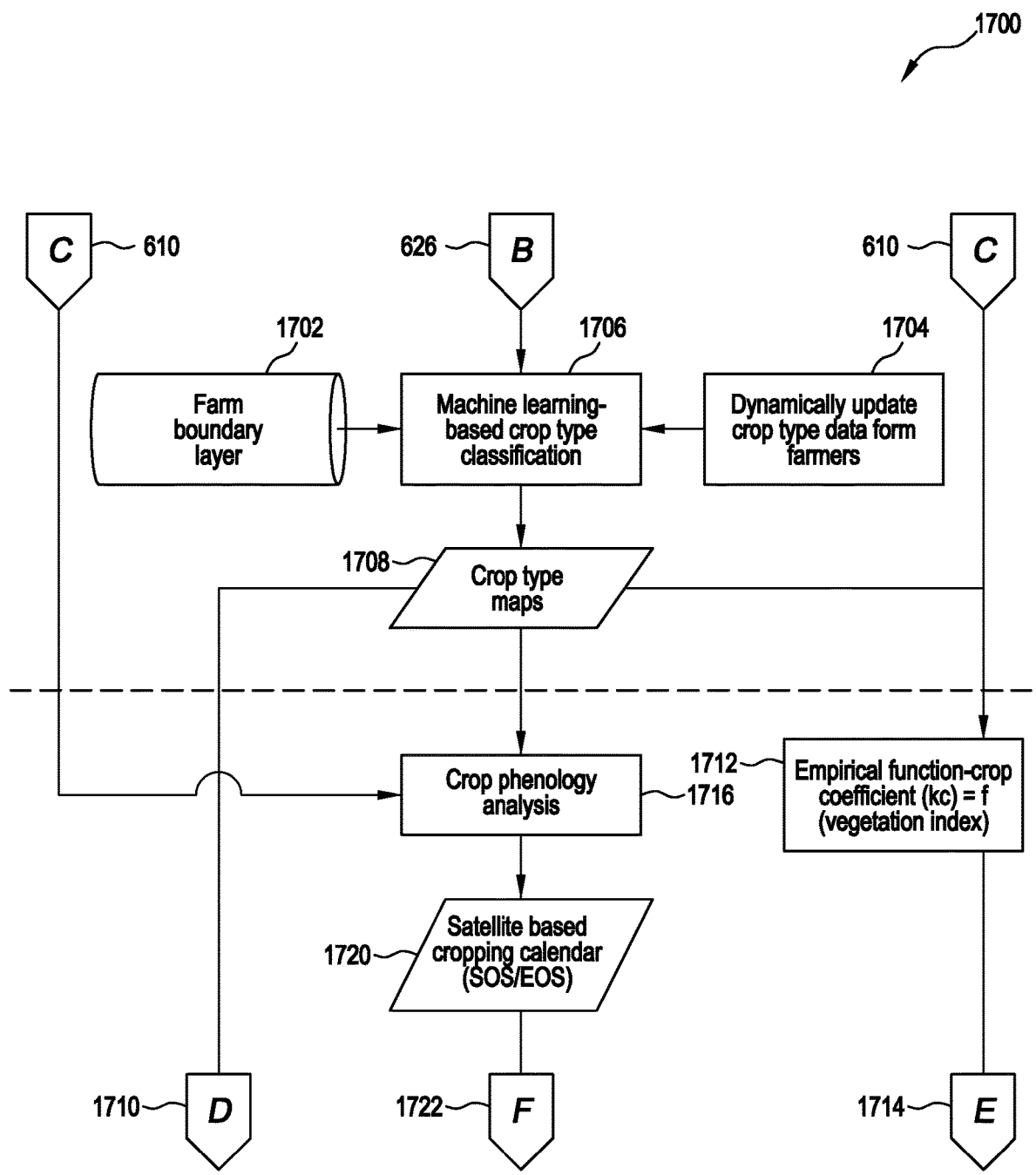
FIG. 17 shows a flowchart illustrating the use of remote sensing data, according to an embodiment of the invention, to determine further properties of crops within irrigated field areas.

Embodiments of the invention further provide methods for estimating crop irrigation performance within a geographical region using the generated field boundaries and irrigation maps. FIG. 17 shows a flowchart 1700 illustrating the use of remote sensing data to determine further properties of crops within each irrigated field area, including a crop coefficient ($k_c$) of each irrigated area. The process 1700 has as inputs time series data of field-scale monthly representative NVDI 610, irrigation maps 626, as well as farm boundary layer data 1702, and any additional crop type data obtained from farmers 1704.

In some embodiments, crop types are further classified over irrigated fields using satellite data and a prior art machine learning (Random Forest) algorithm 1706 using crop type training samples obtained by combining farmer-reported crop type data and irrigated field maps. Separating different types of crops is more difficult than irrigated field detection because crops may show high similarity in terms of satellite features. Embodiments of the invention may therefore employ all bands from Landsat (i.e. not only NDVI) to capture more land surface information in the model training. Model accuracy may be estimated using, for example, kappa coefficient and overall accuracy. A resulting trained model with good accuracy may be used to predict crop types for the remaining irrigated fields. In an exemplary embodiment, the result is a series of crop type maps 1708 that indicate the locations of irrigated crop types, e.g. corn (maize), cotton and rice fields, for each year/season analysed. Advantageously, the detection of irrigated fields enables the estimation of farm-level satellite-based cropping areas, and the crop type classification enables relative water use to be benchmarked by different crop types. The crop type maps 1708 are output 1710 to subsequent analysis steps.

As is well-known, crop coefficients are properties of plants used in predicting evapotranspiration (ET). The most common crop coefficient, kc, is simply the ratio of ET observed for the crop studied over that observed for the well calibrated reference crop under the same conditions. A standard method for obtaining kc defined by the UN Food and Agriculture Association (FAO) is known as FAO-56. However, at step 1712 embodiments of the invention may employ an alternative approach to calculating kc by extraction from satellite data. In this approach, an empirical regression function is developed that relates kc to satellite data such as NDVI. Whereas FAO-56 provides three stage-based kc values (initial stage kc, mid-season stage kc and late-season stage kc), satellite-based kc values can be obtained whenever NDVI is available. In embodiments of the invention, the NDVI time series is firstly interpolated to a daily step. It is therefore possible to calculate daily kc value. While a variety of empirical functions have been employed in the prior art, an exemplary embodiment is based upon a linear relationship, i.e.:

$$k_c = a * NDVI + b$$

where a and b are parameters in the empirical function to be determined by conventional regression analysis. Field-level daily $k_c$ values are then calculated for individual cropping fields, averaged to farm level per crop type, and output 1714 to subsequent analysis steps.

At step 1716, embodiments of the invention determine further parameters comprising key dates of crop growth via a process known as "satellite-based crop phenology analysis". In an exemplary embodiment, the daily-step NDVI time series is analysed using the R programming language package "CropPhenology" to extract phenology metrics. The NDVI time series for crops in the growing season often takes the form illustrated in the chart 1800 shown in FIG. 18 (due to Araya, S., Ostendorf, B., Lyle, G., & Lewis, M. (2018). "CropPhenology: An R package for extracting crop phenology from time series remotely sensed vegetation index imagery". *Ecological informatics*, 46, 45-56). The chart 1800 shows time across the growing season on the horizontal axis 1802, and NVDI on the vertical axis 1804. The NVDI time series 1806 exhibits a characteristic "bell shape" over the season, with low NDVI at the start and end of the season and high NDVI at the peak season. The algorithm in the CropPhenology package calculates a startof-season (SOS) time OnsetT and end-of-season (EOS) time OffsetT. Thus, by using CropPhenology and field-level daily-step NDVI time series, embodiments of the invention are able to determine SOS/EOS. These parameters are then averaged from field-level to farm-level per crop type to generate satellite-based cropping calendar data 1720, which are output 1722 to subsequent analysis steps.

Figure 19:
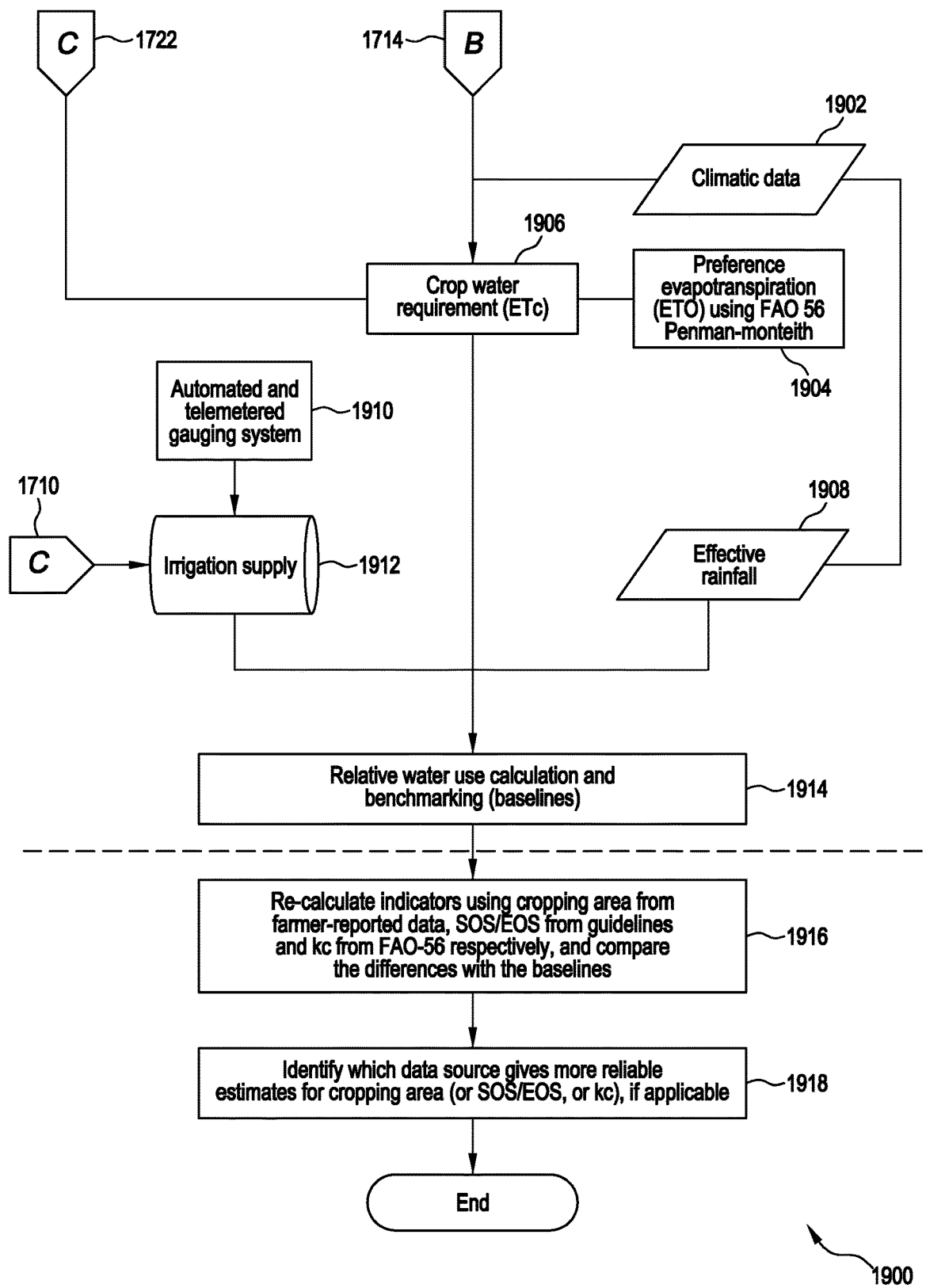
FIG. 19 is a flowchart illustrating a process of calculation and benchmarking of relative water use according to an embodiment of the invention.

FIG. 19 is a flowchart 1900 illustrating a process of calculation and benchmarking of relative water use according to an embodiment of the invention. Inputs to the process 1900 include the crop type maps 1710, crop coefficient maps 1714, and cropping calendar data 1720 generated from remote sensing data via the methods described above with reference to FIG. 17. In an exemplary embodiment, a dense weather station network deployed throughout the irrigation region is used to obtain weather data 1902 for accurate crop water estimation. This data is used at step 1904 to calculate reference evapotranspiration $ET_0$ using the Penman-Monteith method in accordance with the FAO-56 standard. At step 1906, crop evapotranspiration is then estimated according to the FAO-56 standard as:

$$\text{Crop evapotranspiration } (ETc) = ET_0 * k_c$$

In an exemplary embodiment, $ET_c$ is firstly calculated using the daily step and then summed up across the crop growing season between SOS and EOS, using the cropping calendar data 1722, to obtain seasonal $ET_c$.

In an exemplary embodiment, effective rainfall data 1908 is also obtained over the region. Daily rainfall can be extracted from the data 1902 gathered by the dense weather station network, or can use other available sources of rainfall data (e.g. in Australia such data is available via the Australian Water Availability Project). Rainfall may have high spatiotemporal variability within a small area, so it is preferable to obtain accurate rainfall measurements from the dense weather station network to improve the quality of farm-level rainfall data. Daily rainfall data between SOS and EOS are then summed up to generate seasonal rainfall data. Effective seasonal rainfall data 1908 (e.g. in millimetres of rainfall) may then be estimated from the seasonal rainfall by multiplying by a reduction coefficient. In the exemplary embodiment, for the CIA, the coefficient used is 0.8.

In an exemplary embodiment, a fully automated and telemetered gauging system 1910 deployed within the irrigation area is used to measure irrigation supply data at the outlet of farms. Seasonal irrigation supply 1912 (e.g. in megalitres) is then calculated by aggregating irrigation volume per event recorded by the gauging system.

At step 1914, a number of farm-level relative water use indicators are computed from the seasonal ETc (mm), effective rainfall (mm), seasonal irrigation supply (ML) and farm-level cropping area (ha) data obtained as described above with reference to FIGS. 17 to 19. In an exemplary embodiment the farm-level relative water use indicators comprise the indicators listed in Table 5.

TABLE 5

Farm-level relative water use indicators

| Index | Description | Equation | Unit |
|---|---|---|---|
| 1 | Water use per unit area | $\dfrac{\text{Seasonal irrigation supply}}{\text{Cropping area}}$ | ML/ha |
| 2 | Annual relative total water use | $\dfrac{\text{Crop evapotranspiration (ETc)}}{(\text{Seasonal irrigation supply} + \text{Effective rainfall})}$ | N/A |
| 3 | Annual relative irrigation water use | $\dfrac{\text{Crop evapotranspiration (ETc)}}{\text{Seasonal irrigation supply}}$ | N/A |

At steps 1916 and 1918, the benefits of employing methods and systems embodying the present invention are evaluated by comparison against prior art approaches. Results from an exemplary comparison exercise will now be discussed with reference to FIGS. 20 to 23.

For the purposes of comparison, cropping area, SOS/EOS and crop coefficient ($k_c$) are identified as the three key variables determining the indicator values. In practice, other than satellite-based estimates, scientists often use data from farmer reports or crop guidelines for these three variables. It is thus useful to understand how the values and accuracy of the indicators are affected by using different data source for these variables. The understanding of indicator variability gives insights into the credibility of results of benchmarking farm irrigation performance via embodiments of the invention. An exemplary comparison exercise replaces the data of one variable at one time to identify the change of indicators, in accordance with Table 6.

TABLE 6

Summary of data source for comparison

| Index | Variable | Data from System Embodying the Invention | Alternative Data |
|---|---|---|---|
| 1 | Cropping area | Satellite-based cropping area estimates obtained from irrigated field maps | Farmer-reported cropping area |
| 2 | Start date of the season (SOS) and End date of the season (EOS) | Satellite-based crop phenological analysis which generates penology metrics including SOS/EOS | OS/EOS obtained from local crop guidelines and FAO-56 |
| 3 | Crop coefficient ($k_c$) | Satellite-based $k_c$ estimates | $k_c$ values obtained from FAO-56 |

Differences are estimated (step 1916) according to:

$$Diff_{crop_i, year_j, Var_k} = \frac{Indicator_{crop_i, year_j} - \text{Alternative indicator}_{crop_i, year_j, Var_k}}{Indicator_{crop_i, year_j}}$$

In this equation: $Diff_{crop_i, year_j, Var_k}$ is the difference between the indicator calculated using the alternative data and the indicator based on an embodiment of the invention, for a specific crop at one year led by the change of one input variable; $crop_i$ is the $i^{th}$ type of crop among corn, cotton and rice (i=1, 2, 3); $year_j$ is the $j^{th}$ year from the tested period (2013-14 to 2018-19, j=1, 2, 3, 4, 5, 6); and $Var_k$ indicates the $k^{th}$ variable selected from cropping area, SOS/EOS and $k_c$ (k=1, 2, 3).

For those variables that lead to large variability in indicators, the exemplary comparison exercise also seeks (step 1918) to identify which data source gives better estimates of these variables, if applicable.

Figure 20:
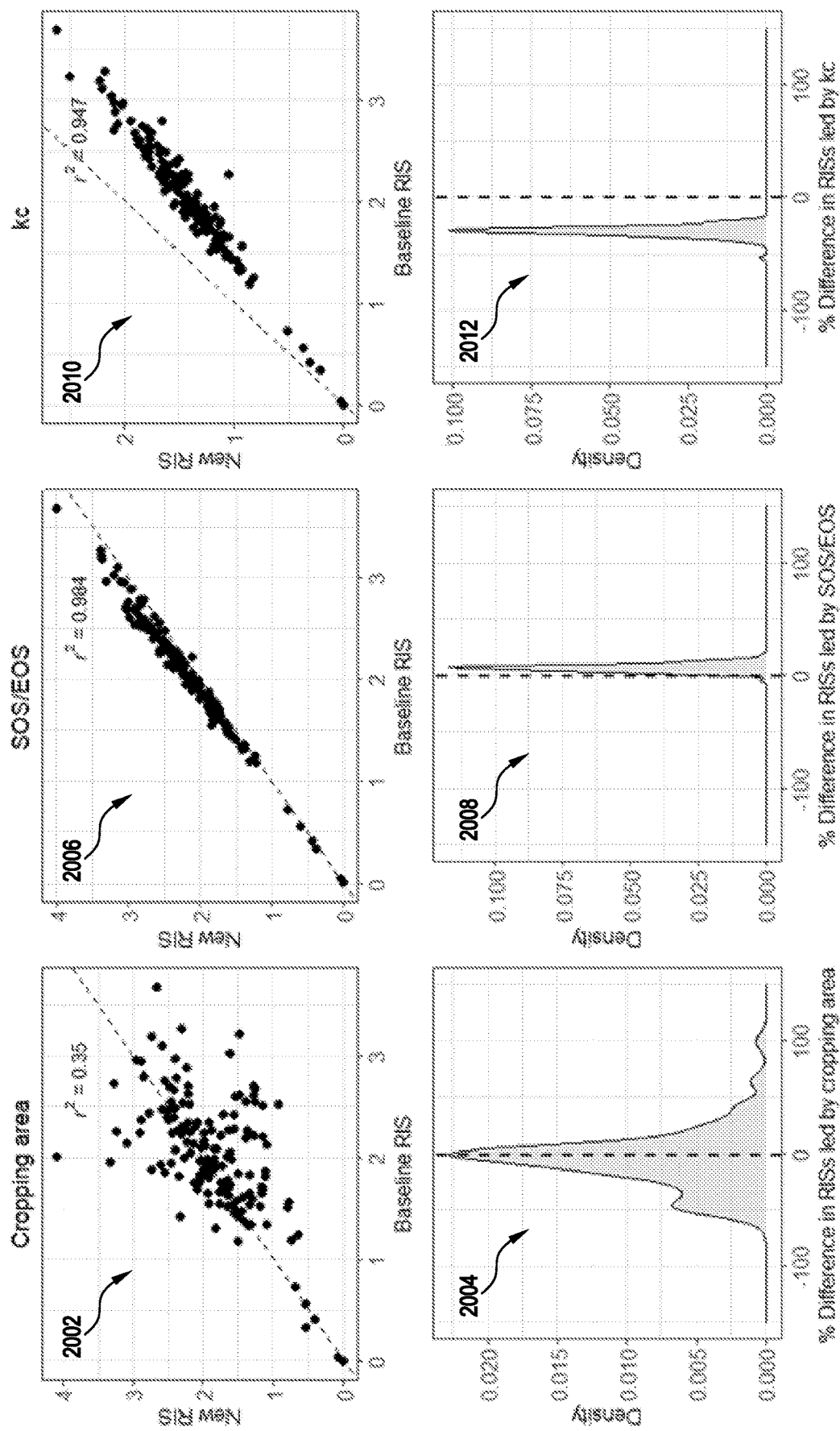
FIG. 20 shows a series of charts comparing variables based on an embodiment of the invention, and variables calculated using data from alternative sources.

FIG. 20 shows a series of charts comparing variables based on an embodiment of the invention, and variables calculated using data from alternative sources. For each indicator there is shown a scatter plot, based on data from rice farms in 2013-14, comparing the pairs of values, and a density plot showing the distribution of differences. These plots are provided for cropping area (2002, 2004), SOS/EOS (2006, 2008) and $k_c$ (2010, 2012). From these plots it can be seen that cropping area is the variable that leads to the largest variability of indicators, i.e. relatively low $R^2$ implies that indicators will show larger differences when changing the cropping area from satellite-based estimates to farmer-reported data. Further, the difference for cropping area is broadly-distributed around the mean, which implies that the indicators estimated using different cropping area data could be uncertain. In this case, it is expected that the results of benchmarking farm irrigation performance would be less robust to the source of data, i.e., the ranking of farms can change based on data inputs. In contrast, although disagreement was also observed in $k_c$, the error is more systematic, and the systematic shift of indicators will not lead to the change in farm ranking and thus having less influence on benchmarking results.

Figure 21:
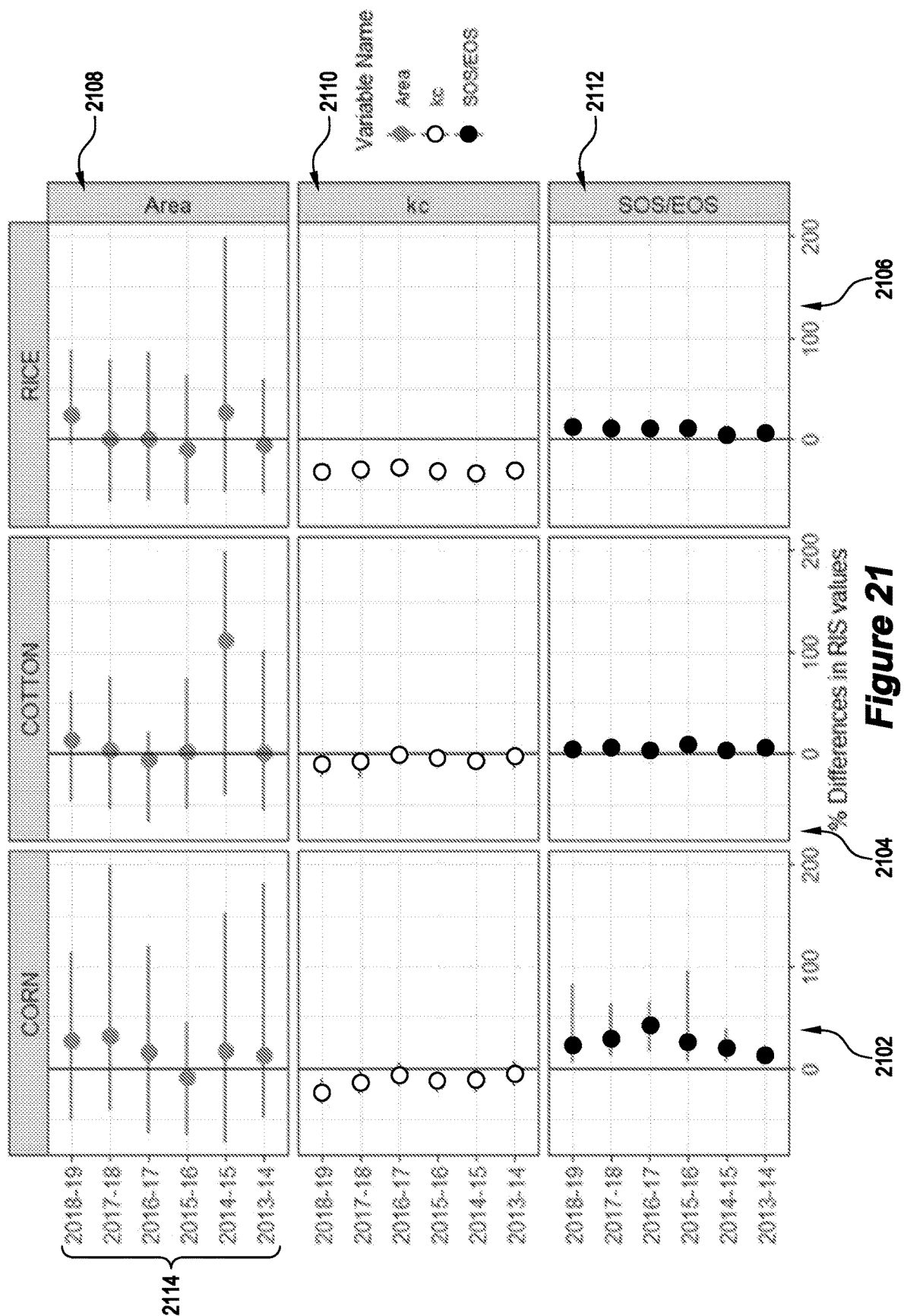
FIG. 21 shows a grid of charts summarising indicator variability based on different data sources.

FIG. 21 shows a grid of charts summarising indicator variability based on different data sources for cropping area, SOS/EOS and $k_c$ for all crops and years. In particular, the columns correspond to corn 2102, cotton 2104 and rice 2106, while the rows correspond to the three variables cropping area 2108, SOS/EOS 2110 and $k_c$ 2112. The different years 2114 are spanned by each chart in the grid. These charts confirm the high variability of cropping area from different data sources across all years and all crop types. It is therefore of significance to establish which data source is likely to be most reliable.

Figure 22:
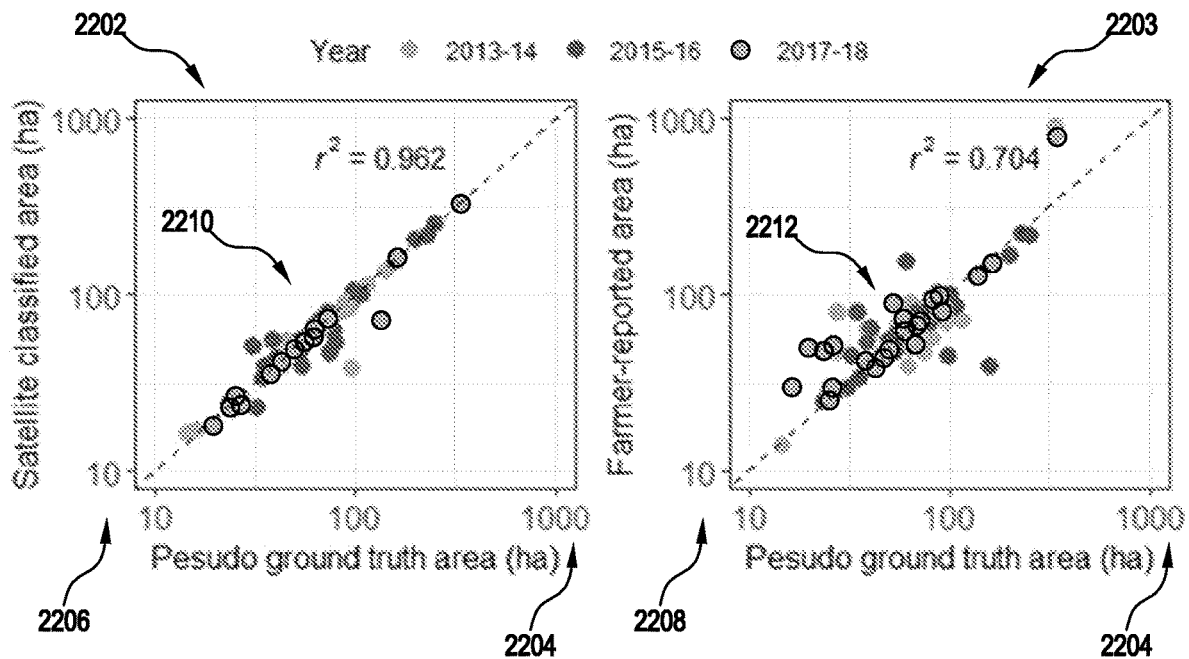
FIG. 22 shows scatter plots of ground truth against satellite classified cropping area and against farmer reported cropping area.
Figure 23:
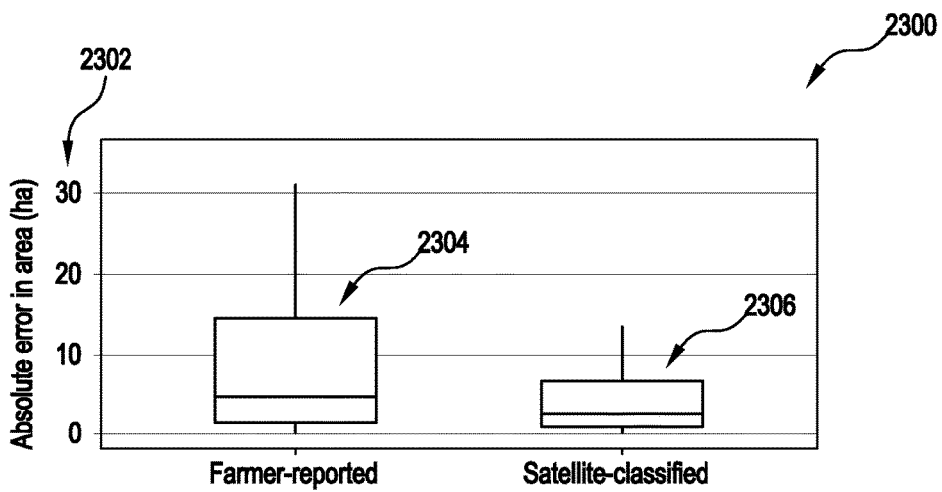
FIG. 23 shows a chart comprising box plots of the farmer reported and satellite classified errors.

To assess the accuracy of crop area data, ground truth values of farm-level cropping area have been obtained by manual review and delineation using Google Earth and peak-season Landsat false-color composites which highlight the locations of cropping fields. The ground truths values are then compared with two estimates over a subset of farms across multiple years. The results are illustrated in FIG. 22, which shows scatter plots of ground truth against satellite classified cropping area 2202 and against farmer reported cropping area 2203. In each case, the horizontal axis 2204 represents the ground truth value, and the vertical axes the satellite classified 2206 and farmer reported 2208 areas respectively. The scatter of satellite classified results 2210 and farmer reported results 2212 clearly show that the satellite classified data has a much smaller error relative to the ground truth. This is further illustrated in FIG. 23, which shows a chart 2300 comprising box plots of the farmer reported and satellite classified errors. The vertical axis 2302 represents the absolute error (in hectares), while the two box plots 2304, 2306 clear demonstrate much smaller average errors and variance from the satellite classified data.

The comparison demonstrates that embodiments of the invention are able to produce estimates of key variables cropping area, SOS/EOS and crop coefficient ($k_c$) that are at least as good, and may be much better, than conventional and/or prior art approaches. Furthermore, systems embodying the invention are able to obtain these estimates substantially through the use of remote sensing data, potentially reducing the time, cost, complexity, and manual effort involved in generating indicators of irrigation performance. Advantageously, the performance indicators can be computed at field and farm level, enabling automated benchmarking and ranking of irrigation performance between farms. Identifying the best performing farms within a geographical region is a powerful capability than enables best practices to be identified and propagated to other farms, thereby improving overall cropping performance and irrigation efficiency.

Embodiments of the invention can be deployed in an irrigation management system which may comprise subsystems and components as disclosed in a number of the present Applicant's earlier patent applications, as follows.

In the Applicant's FLUID REGULATION of PCT Application No. PCT/AU2002/000230 (published as WO2002/071163A1, the contents of which publication are incorporated herein by reference), there is disclosed a computer-based system for predicting the fluid level in a fluid flow network. The system uses past and present measurements of parameters to predict and control fluid level and flow. It gathers data from timed fluid levels and opening positions of regulators or valves to provide a model from which fluid levels and flow can be determined in real time. Further improvements are disclosed in the Applicant's DEMAND MANAGEMENT SYSTEM FOR FLUID NETWORKS of PCT Application No. PCT/AU2012/000907 (published as WO2013/016769A1, the contents of which publication are incorporated herein by reference), and the Applicant's METHOD OF DEMAND MANAGEMENT AND CONTROL OF FLUID PIPE NETWORKS of PCT Application No. PCT/AU2014/050208 (published as WO2015/031954A1, the contents of which publication are incorporated herein by reference), which describe methods and systems that enable customers to place orders for allocation of water, i.e. to request a selected flow rate at a selected time. The disclosed systems and methods ensure that the demand does not exceed the available supply, and that any violations (i.e. demands that exceed the supply constraints) are appropriately rescheduled as per business rules that suites operations of each irrigation region, which can be used with embodiments of the present invention.

Knowing the status of the water content in the soil (soil moisture) is valuable information in determining when and how much water to apply (irrigate) to a crop that is growing in that soil. Soil moisture can be measured directly using instruments such a soil moisture probe (e.g., Sentek capacitance probe). These devices give valuable information on the soil moisture, but only for a specific location in a field. Alternatively, soil moisture can be estimated using a soil water balance model. Water out of the soil through evapotranspiration can be estimated using the Penman-Monteith equation and when combined with the added knowledge of the water that is entering the soil via irrigation and/or rainfall, it is possible to determine the relative status of soil moisture for an area of land or field.

For example, the Applicant's METHOD AND SYSTEM FOR WATER DISTRIBUTION AND SOIL MOISTURE DETERMINATION of PCT Application No. PCT/AU2018/050858 (published as WO2019/033158A1, the contents of which publication are incorporated herein by reference) discloses systems and methods that spatially derive soil moisture for any location within an irrigation district, and that provide the ability to map the soil moisture at any point in time and spatially across an irrigation district. The disclosed soil moisture determination system includes a networked computer system connected to a plurality of weather stations within the irrigation district to measure a selection from: solar radiation spectrum, wind speed, rainfall, temperature, humidity, barometric pressure, and energy measurement from solar panels at each of a plurality of representative locations. The networked computer system also has data access to crop factor, soil type, and irrigation historical data at the representative locations, and uses system identification techniques to produce an algorithm for evapotranspiration based on a predetermined selection from the weather station measurements and the data access to crop factor, soil type, and irrigation historical data at the representative locations. The networked computer system calibrates the algorithm by direct measurement of the moisture in the soil at each of the representative locations by respective soil moisture sensors, and uses measured parameters of rainfall, soil type, irrigation historical data and crop factor with the algorithm to derive or interpolate soil moisture at any selected location within the irrigation district, such as within irrigated field areas identified by an embodiment of the present invention. Suitable weather stations and rainfall gauges for use with this system are disclosed in the Applicant's RAIN GAUGE/WEATHER STATION of PCT Application No. PCT/AU2018/051205 (published as WO2019/090391 A1, the contents of which publication are incorporated herein by reference).

Further improvements may be achieved using the Applicant's METHOD AND SYSTEM FOR PLANT STRESS DETERMINATION AND IRRIGATION BASED THEREON of PCT Application No. PCT/AU2019/050919 (published as WO2020/047579A1, the contents of which publication are incorporated herein by reference), which discloses systems and methods for determining plant stress at a location within the irrigation district using visual and infrared imaging. The disclosed plant stress determination system includes a computer-based camera system having thermal imaging and visual imaging to capture foliage at close proximity to at least one plant to provide high resolution images/video, and analyses both thermal and visual images/video to form a composite image. The thermal activity of the composite image/video and photosynthesis state of the plant is determined, from which plant stress is derived. Ground measurement of plant stress, as disclosed in this prior application, may advantageously be used to provide ongoing calibration of soil moisture estimates, and of the irrigation management system.

It is typical for crops to be irrigated in repeatable units or areas of land. This is the case whether water is applied by either sprinkler, drip, or surface (flood techniques, e.g., border check or furrow), which are the three common methods of irrigation application. These units of land and data associated with them are critical in determining the water used by the crop (ET) and in turn the soil moisture deficit (SMD), which is defined as the amount of rain and irrigation needed to bring the soil moisture content back to field capacity using the well-known known methods of derivation.

As has been described, the present invention provides methods to determine spatial boundaries, crop factor and crop type of an irrigated unit of land that is irrigated in a repeated cycle over the growing season of the crop from sowing through to harvest. Using localized climate data and remote sensing data, the water used by the crop (ET) can be computed for the irrigated unit of land. The SMD can then be computed using data on irrigation water applied as well as any rainfall on the irrigated unit of land. Adjustments can also be made to the SMD to allow for the estimated percolation beyond the root zone.

Where irrigation water is supplied through a water reticulation network by an irrigation district, the ET and SMD for irrigation units can be aggregated based on the topology of the network that supplies the irrigation units within the district. A computer-implemented system incorporating features of the present invention, and which supports district operations including meteorological data gathering and management, water ordering, water flow scheduling and control, soil moisture and plant stress monitoring, as described, for example, the Applicant's earlier patent applications noted above, may be further developed to provide additional benefits and enhanced functionality.

The water ordering system would allow irrigation farmers to confirm spatial boundaries of the irrigation unit and the crop being grown (including yield), which will have been derived using the method described in this invention. The feedback of this information (using Machine Learning techniques) will further assist in refining the described method.

In some embodiments of an irrigation management system incorporating the present invention, for example, a water ordering system may be used to obtain data (volume, flow, timing, etc) on water that has been applied to an irrigation unit. The source of this water may also be defined (e.g. district supply infrastructure, groundwater, or on-farm dam). Flow or volumetric measurement methods are assumed to be available for these sources of water. An additional source of information would be the measurement of any tailwater i.e. the excess surface water that flows from the irrigation unit following an irrigation. Rainfall data can be obtained from the same network of local weather stations that provides data to derive ET. Data gathered throughout the irrigation management system supports the more accurate derivation of ET and SMD for irrigation units. Advantageously, then, the water ordering system is able to notify irrigation farmers of the ET/SMD for their irrigation units and support the efficient scheduling of irrigations.

Embodiments of the irrigation management system may include support for operation of a water supply network that can aggregate the ET/SMD data of the irrigation units to provide summary ET/SMD for segment areas of the water distribution network.

Embodiments may provide a system that can measure the Water Use Efficiency (WUE) of the individual irrigation units and being derived from the measured volume of water applied and the ET/SMD. Here, WUE is defined as the ratio of leaf photosynthesis and transpiration, the amount of plant or crop dry matter per unit water transpired, or the amount of crop dry matter or lint yield per unit ET.

Embodiments may provide a system that can measure the WUE at an aggregated summary level for whole water distribution network or at any intermediate levels for segments of the network. Advantageously, such a system would assist in tracking and locating opportunities to drive on-farm WUE improvements.

Embodiments may provide a system that performs benchmarking comparisons of WUE for individual irrigation units or at a summary level within an irrigation supply network. The benchmarking comparisons could also be based on common parameters such as crop type, soil type, enterprise type, irrigation application type, and so forth.

Embodiments may provide a system that can predict more accurate forecast demands for the water distribution network. Forecast demand may be derived from the aggregated ET/SMD for the district or any intermediate levels for segments of the network. The ability to better forecast future water demand for a district advantageously allows operators to match the demand more accurately with the bulk supply system for a district. Bulk supply systems are often some distance from the district and have lengthy supply travel times associated with them. Often orders on the bulk supply system are conservative to ensure there is no shortage of water which in turn leads to an oversupply. Greater supply efficiencies can therefore be achieved through the improved forecasting of demand.

Advantageously, forecast capability may be improved by using AI, machine learning, or other techniques to analyse the history of use (via the water ordering system) to determine more accurately at what SMD level the farmer typically irrigates the irrigation unit and what is the typical target SMD at the completion of an irrigation and/or volume applied. Other data such as application method and crop and soil types would also enhance this forecast capability.

Forecast capability may be further improved by using climate forecasts to, in turn, forecast longer-term crop ET and rainfall. This would provide an advance time horizon forecast of the aggregated district ET/SMD in addition to that provided by the actual measured (and derived) ET/SMD. Having an advanced time horizon forecast of the district demand will improve the ability of the system to more accurately match the supply from bulk supply systems with the demand.

Embodiments of the invention have been described above by way of non-limiting example only. Variations and modifications to the embodiments may be made without departing from the scope of the invention as defined in the appended claims.

The invention claimed is:

1. An automated method comprising:
   identifying a plurality of field areas delineated by field boundaries within a geographical region;
   processing seasonal normalised difference vegetation index (NDVI) time series data to generate a plurality of aggregate field NDVI feature values for each identified field area; and
   classifying irrigation status of each identified field area by executing a decision tree classifier that is configured to determine a classification as either 'irrigated' or 'non-irrigated' based upon the corresponding plurality of aggregate field NDVI feature values.

2. The method of claim 1 where in the step of identifying a plurality of field areas delineated by field boundaries comprises analysing digital imagery of the geographical region by, for each one of the plurality of field areas:
   computing a grey-level co-occurrence matrix (GLCM) to obtain a GLCM-variance value;
   determining a scale level parameter value based on the GLCM-variance value; and
   executing an edge-based watershed transform algorithm using the determined scale level parameter value to determine the field boundaries.

3. The method of claim 2 wherein the scale level parameter value is determined according to a step-wise series of predetermined values based on a monotonic relationship between the GLCM-variance value and the scale level parameter value.

4. The method of claim 1 wherein the step of processing seasonal NDVI data comprises:
   acquiring an NDVI time sequence comprising a plurality of NDVI images of the geographical region each captured at a corresponding capture time within a seasonal period;
   executing a resampling algorithm to obtain, for each field area at each capture time within the seasonal period, a corresponding single representative NDVI value; and
   computing the plurality of aggregate field NDVI feature values for each field area using the corresponding representative NDVI values.

5. The method of claim 4 wherein the resampling algorithm comprises a resampling Gaussian Mixture Model (GMM) algorithm.

6. The method of claim 5 wherein the resampling GMM algorithm comprises a two-component GMM algorithm from which, for each field area, first and second clusters of NDVI pixel values are identified, and a representative NDVI value is computed for each field area by determining whether the second cluster is more representative of the field area than the first cluster and, if so, then using the NDVI pixel values of the second cluster to compute the representative NDVI value.

7. The method of claim 6 wherein the first and second clusters of NDVI pixel values have corresponding mean values $\mu_1$ and $\mu_2$ with $\mu_2 > \mu_1$, corresponding standard deviations $\sigma_1$ and $\sigma_2$, and the representative NDVI value is computed by:
   using a t-test to determine whether a difference between $\mu_1$ and $\mu_2$ is statistically significant;
   in the event that the difference is statistically significant then selecting $\mu_2$ as the representative NDVI value if the number of NDVI pixels in the second cluster is greater than a threshold proportion of the total number of NDVI pixels in the field area, otherwise selecting $\mu_1$ as the representative NDVI value; and
   in the event that the difference is not statistically significant, then computing an average of all NDVI pixels in the field area as the representative NDVI value.

8. The method of claim 7 wherein the threshold proportion of the total number of NDVI pixels in the field area is about 20%.

9. The method of claim 4 wherein the plurality of aggregate NDVI feature values for each field area comprises:
   a maximum of the representative NDVI values over all capture times within the seasonal period; and
   a range of the representative NDVI values, calculated using a difference between a maximum and a minimum of the representative NDVI values over all capture times within the seasonal period.

10. The method of claim 9 wherein the plurality of aggregate NDVI feature values for each field area further comprises one or more values selected from:
   the representative NDVI values at each capture time within the seasonal period;
   an average of a selected group of the representative NDVI values from the capture times within the seasonal period;
   a minimum of the representative NDVI values over all capture times within the seasonal period;
   a set of categorical values indicating whether or not the representative NDVI values at each capture time within the seasonal period is above or below a predetermined threshold;
   one or more values indicative of a sub-period of capture times within the seasonal period during which the representative NDVI values are within a predetermined upper and/or lower quantile;
   one or more values indicative of a number of capture times within the seasonal period during which the representative NDVI values are above a predetermined value; and
   one or more values calculated from a difference between a selected pair of the representative NDVI values from the capture times within the seasonal period.

11. The method of claim 10 wherein:
   the selected group of the representative NDVI values from which the average is calculated comprises the three largest representative NDVI values of the capture times within the seasonal period; and/or
   the predetermined threshold used to obtain the set of categorical values is 0.6; and/or
   the predetermined upper quantile used to obtain the values indicative of a sub-period of capture times within the seasonal period is an 80% quantile; and/or
   the predetermined lower quantile used to obtain the values indicative of a sub-period of capture times within the seasonal period is a 20% quantile; and/or
   the predetermined value used to obtain the values indicative of a number of capture times within the seasonal period during which the representative NDVI values are above the predetermined value is selected from the set $\{0.5, 0.6, 0.7, 0.8\}$; and/or
   the selected pair of the representative NDVI values from the capture times within the seasonal period from which the difference is obtained is a successive pair having a largest positive difference; and/or
   the selected pair of the representative NDVI values from the capture times within the seasonal period from which the difference is obtained is a pair having a second and third largest representative NDVI values.

12. The method of claim 9 wherein the decision tree classifier comprises a single tree with a depth of two, wherein execution of the decision tree classifier comprises:
   determining, at a first split, whether the maximum of the representative NDVI values is greater than a threshold maximum NDVI value and, if so, then determining, at a second split, whether the range of the representative NDVI values is greater than a threshold NDVI range value and, if so, then classifying the corresponding field area as 'irrigated'; and
   otherwise, classifying the corresponding field area as 'non-irrigated'.

13. The method of claim 12 wherein the threshold maximum NDVI value is a predetermined value and the predetermined threshold maximum NDVI value is about 0.6.

14. The method of claim 12 wherein the threshold maximum NDVI value is a dynamic value that is computed based upon maximum representative NDVI values corresponding with all field areas within the geographical region over all capture times within the seasonal period and wherein the dynamic threshold maximum NDVI value is computed by executing a threshold determination GMM algorithm.

15. The method of claim 14 wherein the threshold determination GMM algorithm comprises a k-component GMM algorithm, wherein the number of components, k, is determined by applying Bayesian Inference Criteria (BIC) to optimise a fit of the GMM model to a distribution of the maximum representative NDVI values, whereby each of the maximum representative NDVI values is allocated into an i-th cluster of k total clusters wherein the distribution of cluster values is modelled as a Normal distribution $N_i/(\mu_i, \sigma_i)$.

16. The method of claim 15 wherein the threshold determination GMM algorithm further comprises reassigning the maximum representative NDVI values of the k clusters to first and second derived clusters by a method comprising steps of:
   computing a reassignment quantile for each cluster i of the k clusters;
   reassigning the maximum representative NDVI values of clusters for which the reassignment quantile is less than a reassignment threshold to the first derived cluster; and
   reassigning the maximum representative NDVI values of clusters for which the reassignment quantile is greater than or equal to the reassignment threshold to the second derived cluster,
   wherein the dynamic threshold maximum NDVI value is computed based upon statistical parameters of the first and second derived clusters.

17. The method of claim 16 wherein the first and second derived clusters of maximum representative NDVI values have corresponding mean values $\mu_{d1}$ and $\mu_{d2}$, corresponding standard deviations $\sigma_{d1}$ and $\sigma_{d2}$, and the dynamic threshold maximum NDVI value ($T_d$) is computed according to:

$$T_d = \frac{\mu_{d1} \cdot \sigma_{d2} + \mu_{d2} \cdot \sigma_{d1}}{\sigma_{d1} + \sigma_{d2}}.$$

18. The method of claim 12 wherein the threshold NDVI range value is a predetermined value and the predetermined value of the threshold NDVI range value is about 0.4.

19. The method of claim 1 wherein the decision tree classifier comprises a random forest machine learning (RFML) model that is preconfigured to take the plurality of aggregate field NDVI feature values of an identified field area as input, and to generate an output value indicative of whether the identified field area is 'irrigated' or 'non-irrigated'.

20. The method of claim 19 wherein preconfiguring the RFML model comprises training the RFML model in a supervised training mode using training data consisting of a plurality of training sets of aggregate field NDVI feature values and corresponding label values identifying each training set of aggregate field NDVI feature values as either 'irrigated' or 'non-irrigated' and wherein the training data is compiled by a method comprising:
   identifying a plurality of training data field areas and associated training data time periods for which irrigation information is available as to whether the field areas were irrigated or non-irrigated;
   computing training sets of aggregate field NDVI feature values for each identified training field area over each training data time period;
   categorising each training data field area as a 'static' field area if the corresponding training sets of aggregate field NDVI feature values do not vary significantly between training data time periods, or as a 'dynamic' field area if the corresponding training sets of aggregate field NDVI feature values do vary significantly between training data time periods;
   compiling a static training data subset comprising the training sets of aggregate field NDVI feature values and corresponding irrigation information for each training data field area classified as a 'static' field area; and
   training the RFML model using the static training data subset.

21. The method of claim 20 further comprising:
   compiling a dynamic training data subset comprising updated training sets of aggregate field NDVI feature values and corresponding irrigation information for each training data field area classified as a 'dynamic' field area; and
   retraining the RFML model using the static and dynamic training data subsets.

22. The automated method of claim 1 further comprising:
   using remote sensing data to determine one or more properties of crops within each irrigated field area, wherein the properties include at least a crop coefficient ($k_c$) of each irrigated area;
   for each irrigated field area, using the determined crop coefficient and recorded weather data to calculate an estimate of crop water requirements; and
   computing values of one or more crop irrigation performance indicators based at least upon the calculated estimates of crop water requirements, and measures of irrigation water supplied to the geographical region.

23. A system comprising:
   a processor;
   a memory device accessible by the processor; and
   a data store accessible by the processor,
   wherein the memory device contains a body of program instructions which, when executed by the processor, cause the system to implement a method comprising:
      identifying a plurality of field areas delineated by field boundaries within a geographical region;
      retrieving seasonal normalised difference vegetation index (NDVI) time series data from the data store;
      processing the seasonal NDVI time series data to generate a plurality of aggregate field NDVI feature values for each identified field area; and
      classifying irrigation status of each identified field area by executing a decision tree classifier that is configured to determine a classification as either 'irrigated' or 'non-irrigated' based upon the corresponding plurality of aggregate field NDVI feature values.

24. A system comprising:
   a processor;
   a memory device accessible by the processor; and
   a data store accessible by the processor,
   wherein the memory device contains a body of program instructions which, when executed by the processor, cause the system to implement a method comprising:
      identifying a plurality of field areas delineated by field boundaries within a geographical region;
      retrieving seasonal normalised difference vegetation index (NDVI) time series data from the data store;
      processing the seasonal NDVI time series data to generate a plurality of aggregate field NDVI feature values for each identified field area;
      classifying irrigation status of each identified field area by executing a decision tree classifier that is configured to determine a classification as either 'irrigated' or 'non-irrigated' based upon the corresponding plurality of aggregate field NDVI feature values;
      retrieving remote sensing data of the geographical area from the data store;
      using the remote sensing data to determine one or more properties of crops within each irrigated field area, wherein the properties include at least a crop coefficient ($k_c$) of each irrigated area;
      retrieving recorded weather data from the data store;
      for each irrigated field area, using the determined crop coefficient and the recorded weather data to calculate an estimate of crop water requirements;
      retrieving measured irrigation water supplied to the geographical region from the data store; and
      computing values of one or more crop irrigation performance indicators based at least upon the calculated estimates of crop water requirements and the measured irrigation water supplied to the geographical region.

25. An irrigation management system comprising:
   an irrigation status classification system including a processor configured to identify a plurality of field areas delineated by field boundaries within a geographical region, retrieve seasonal normalised difference vegetation index (NDVI) time series data from the data store, process the seasonal NDVI time series data to generate a plurality of aggregate field NDVI feature values for each identified field area, and classify irrigation status of each identified field area by executing a decision tree classifier that is configured to determine a classification as either 'irrigated' or 'non-irrigated' based upon the corresponding plurality of aggregate field NDVI feature values;

a soil moisture determination system including a networked computer system connected to a plurality of weather stations within the geographical region to measure a selection from solar radiation spectrum, wind speed, rainfall, temperature, humidity, barometric pressure, and energy measurement from solar panels at each of a plurality of representative locations, the networked computer system having data access to crop factor, soil type, and irrigation historical data at the representative locations, and producing an algorithm for evapotranspiration based on a predetermined selection from the weather station measurements and the data access to crop factor, soil type, and irrigation historical data at the representative locations, the networked computer system calibrating the algorithm by direct measurement of the moisture in the soil at each of the representative locations by respective soil moisture sensors and using measured parameters of rainfall, soil type, irrigation historical data and crop factor with the algorithm to derive or interpolate soil moisture within irrigated field areas identified by the irrigation status classification system; and a water ordering system configured to monitor soil moisture determined by the soil moisture determination system for irrigation units including irrigated field areas identified by the irrigation status classification system, receive requests for timed irrigation from end users for the irrigation units, and to allow requested irrigation to occur for the irrigation units from the water distribution network based on the monitored soil moisture.

* * * * *